(12) United States Patent
Uechi et al.

(10) Patent No.: US 11,519,303 B2
(45) Date of Patent: Dec. 6, 2022

(54) WASTE HEAT RECOVERY SYSTEM, GAS TURBINE PLANT PROVIDED WITH SAME, WASTE HEAT RECOVERY METHOD, AND INSTALLATION METHOD FOR WASTE HEAT RECOVERY SYSTEM

(71) Applicant: Mitsubishi Hitachi Power Systems, Ltd., Kanagawa (JP)

(72) Inventors: Hideyuki Uechi, Tokyo (JP); Hideaki Sugishita, Tokyo (JP); Yukimasa Nakamoto, Yokohama (JP); Yuichi Oka, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 201 days.

(21) Appl. No.: 16/867,939

(22) Filed: May 6, 2020

(65) Prior Publication Data

US 2020/0325799 A1    Oct. 15, 2020

Related U.S. Application Data

(62) Division of application No. 15/127,633, filed as application No. PCT/JP2015/058271 on Mar. 19, 2015, now abandoned.

(30) Foreign Application Priority Data

Mar. 24, 2014    (JP) .................. 2014-060606

(51) Int. Cl.
*F01K 23/10* (2006.01)
*F02C 9/18* (2006.01)
(Continued)

(52) U.S. Cl.
CPC .............. *F01K 23/10* (2013.01); *F01K 5/02* (2013.01); *F01K 25/10* (2013.01); *F02C 7/185* (2013.01);
(Continued)

(58) Field of Classification Search
CPC . F01K 23/10; F01K 5/02; F01K 25/10; F02C 6/04; F02C 6/06; F02C 6/08;
(Continued)

(56) References Cited

U.S. PATENT DOCUMENTS 4,509,324 A * 4/1985 Urbach ................ F01K 21/047
60/39.17
5,261,226 A * 11/1993 Pillsbury ................ F02C 3/205
60/39.463

(Continued)

FOREIGN PATENT DOCUMENTS

CN    103195570    7/2013
DE    199 41 685    7/2000
(Continued)

OTHER PUBLICATIONS

Written Opinion dated Jun. 23, 2015 in corresponding International Application No. PCT/JP2015/058271, with English Translation.
(Continued)

*Primary Examiner* — Loren C Edwards
(74) *Attorney, Agent, or Firm* — Wenderoth, Lind & Ponack, L.L.P.

(57) ABSTRACT

A gas turbine includes: a compressor configured to compress air; a combustor configured to combust fuel in the air compressed by the compressor so as to generate combustion gas; and a turbine configured to be driven using the combustion gas. Air coolers are configured to bleed the air from a plurality of places having different pressures in the compressor and cool the air bled from the respective places so as to generate cooling air. A waste heat recovery device is configured to recover waste heat from at least two of the air coolers.

4 Claims, 20 Drawing Sheets

(51) Int. Cl.
*F02C 7/18* (2006.01)
*F01K 5/02* (2006.01)
*F01K 25/10* (2006.01)

(52) U.S. Cl.
CPC ............ *F02C 9/18* (2013.01); *F05D 2220/62* (2013.01); *F05D 2220/72* (2013.01); *Y02E 20/14* (2013.01)

(58) Field of Classification Search
CPC .... F02C 6/18; F02C 7/12; F02C 7/143; F02C 7/185; F02C 9/18; F02C 9/52; F05D 2220/62; F05D 2220/72; Y02E 20/14; Y02E 20/16; F02G 5/00; F02G 5/04
See application file for complete search history.

(56) References Cited

U.S. PATENT DOCUMENTS

| | | |
|---|---|---|
| 5,782,076 A | 7/1998 | Huber et al. |
| 6,018,942 A | 2/2000 | Liebig |
| 6,050,080 A | 4/2000 | Horner |
| 6,065,282 A | 5/2000 | Fukue et al. |
| 6,532,744 B1 | 3/2003 | Reiter et al. |
| 6,644,035 B1 | 11/2003 | Yamanaka et al. |
| 6,672,069 B1 | 1/2004 | Stuhlmüller et al. |
| 6,860,109 B2 | 3/2005 | Tsuji |
| 2004/0088995 A1 | 5/2004 | Reissig |
| 2004/0206064 A1 | 10/2004 | Reiter et al. |
| 2007/0033942 A1* | 2/2007 | Benz ................ F02C 3/205 60/772 |
| 2009/0260342 A1 | 10/2009 | Ishiguro et al. |
| 2010/0154434 A1 | 6/2010 | Kubota et al. |
| 2011/0138818 A1 | 6/2011 | Mizukami et al. |
| 2013/0145772 A1* | 6/2013 | Schlesier ............. F02C 6/18 60/775 |
| 2013/0167548 A1 | 7/2013 | Popovic et al. |

FOREIGN PATENT DOCUMENTS

| | | |
|---|---|---|
| DE | 100 27 842 | 12/2001 |
| DE | 697 07 863 | 6/2002 |
| EP | 0 868 599 | 3/2003 |
| EP | 1 162 355 | 10/2006 |
| JP | 57-81104 | 5/1982 |
| JP | 7-54669 | 2/1995 |
| JP | 2000-328962 | 11/2000 |
| JP | 2001-123851 | 5/2001 |
| JP | 2003-201862 | 7/2003 |
| JP | 2005-291094 | 10/2005 |
| JP | 2008-255822 | 10/2008 |
| JP | 2009-191655 | 8/2009 |
| JP | 2014-009606 | 1/2014 |
| WO | 2013/144006 | 10/2013 |

OTHER PUBLICATIONS

International Search Report dated Jun. 23, 2015 in corresponding International Application No. PCT/JP2015/058271, with English Translation.

* cited by examiner

WASTE HEAT RECOVERY SYSTEM, GAS TURBINE PLANT PROVIDED WITH SAME, WASTE HEAT RECOVERY METHOD, AND INSTALLATION METHOD FOR WASTE HEAT RECOVERY SYSTEM

CROSS-REFERENCE TO RELATED APPLICATION

Priority is claimed from Japanese Patent Application No. 2014-060606, filed Mar. 24, 2014, the contents of which are incorporated herein by reference.

TECHNICAL FIELD

The present invention relates to a waste heat recovery system that recovers waste heat when cooling air is generated, a gas turbine plant provided with the same, a waste heat recovery method, and an installation method for waste heat recovery systems.

BACKGROUND ART

Gas turbines have a compressor that compresses air, a combustor that generates combustion gas G by combusting fuel in the air compressed using the compressor, and a turbine that is driven using the combustion gas G In these gas turbines, there are cases in which high-temperature components such as turbine vanes are cooled by supplying bleed air from compressor to the high-temperature components.

Japanese Unexamined Patent Application, First Publication No. H7-54669 discloses a constitution in which intermediate-stage bleed air in a compressor is cooled using air coolers and then the cooled bleed air is supplied to turbine vanes which are high-temperature components.

Technical Problem

However, in the technique described in Japanese Unexamined Patent Application, First Publication No. H7-54669, waste heat generated during the cooling of intermediate-stage bleed air in air coolers is not used and is simply discharged outside, and thus, currently, waste heat is not effectively used.

SUMMARY OF INVENTION

Therefore, the present invention provides a waste heat recovery system, a gas turbine plant, a waste heat recovery method, and an installation method for waste heat recovery systems which enable the effective use of waste heat generated when cooling air is generated from air bled from compressor and are capable of increasing heat usage efficiency.

Solution to Problem

According to a first aspect of the present invention, a waste heat recovery system includes: a plurality of cooling air coolers that, in a gas turbine including a compressor that compresses air, a combustor that combusts fuel in the compressed air so as to generate combustion gas, and a turbine that is driven using the combustion gas, bleed the air from a plurality of places having different pressures in the compressor and cool the air bled from the respective places, thereby generating cooling air; and a waste heat recovery device that recovers waste heat from the at least two cooling air coolers among the plurality of cooling air coolers.

According to the above-described waste heat recovery system, it is possible to generate cooling air which is used to cool, for example, high-temperature components while reducing the power of compressor by means of bleeding from the compressor. In addition, bleeding is carried out in places in the compressor having different pressures, and thus it is possible to generate cooling air having different pressures and temperatures. Therefore, it is possible to recover waste heat having different temperatures from individual cooling air coolers using a waste heat recovery device, and it becomes possible to use waste heat in accordance with the temperatures thereof.

According to a second aspect of the present invention, in the waste heat recovery system of the first aspect, the waste heat recovery device may recover waste heat from higher air pressure parts of at least two cooling air coolers to a higher temperature heating medium as high-temperature waste heat, and may recover waste heat from lower air pressure parts of the at least two cooling air coolers to a lower temperature heating medium as low-temperature waste heat.

As described above, waste heat from the cooling cooler in which the air has higher air pressure becomes the higher temperature waste heat having a higher temperature, and waste heat from the cooling cooler in which the air has lower air pressure becomes the lower temperature waste heat having a lower temperature. In addition, waste heat from each of the cooling air coolers is individually recovered in accordance with the temperature of the heating media, whereby effective use of waste heat becomes possible.

According to a third aspect of the present invention, in the waste heat recovery system of the first aspect, the waste heat recovery device may include a waste heat recovery boiler that heats water using exhaust gas from the turbine, may recover waste heat from higher air pressure parts of the at least two cooling air coolers to a portion of the waste recovery boiler with a higher water temperature as high-temperature waste heat, and may recover waste heat from lower air pressure parts of the at least two cooling air coolers to a portion of the waste heat recovery broiler with a lower water temperature as low-temperature waste heat.

As described above, waste heat from the cooling air cooler in which the air has a higher pressure becomes the higher temperature waste heat having a higher temperature, and waste heat from the cooling air cooler in which the air has a lower pressure becomes the lower temperature waste heat having a lower temperature. In addition, the waste heat recovery boiler is provided, and waste heat from each of the cooling air coolers is individually recovered in accordance with the temperatures of water in the waste heat recovery boiler, whereby effective use of waste heat becomes possible.

According to a fourth aspect of the present invention, in the waste heat recovery system of the first aspect, the waste heat recovery device may include a waste heat recovery boiler that heats water using exhaust gas from the turbine, may recover waste heat from higher air pressure parts of the at least two cooling air coolers to a portion of the waste recovery boiler with a higher water pressure as high-temperature waste heat, and may recover waste heat from lower air pressure parts of the at least two cooling air coolers to a portion of the waste recovery boiler with a lower water pressure as low-temperature waste heat.

As described above, the waste heat recovery boiler is provided, and waste heat from the respective cooling air coolers is individually recovered in accordance with the pressures of water in the waste heat recovery boiler, whereby effective use of waste heat becomes possible.

According to a fifth aspect of the present invention, in the waste heat recovery system of the third or fourth aspect, the waste heat recovery device may further include, in addition to the waste heat recovery boiler, a steam turbine that is driven using the water heated in the waste heat recovery boiler as an operating medium.

As described above, the waste heat recovery system includes a Rankine cycle. In addition, waste heat from the cooling air coolers are recovered to individual locations of the Rankine cycle in accordance with the temperatures of the waste heat, whereby it is possible to efficiently drive the Rankine cycle and obtain rotative power from waste heat from the cooling air coolers. Therefore, more effective use of waste heat becomes possible.

According to a sixth aspect of the present invention, in the waste heat recovery system of the first aspect, the waste heat recovery device may include a plurality of low-boiling-point medium Rankine cycles in which low-boiling-point media each having a different boiling point repeat a cycle consisting of condensation, evaporation and circulation due to the recovered waste heat, may recover waste heat from higher air pressure parts of the at least two cooling air coolers as high-temperature waste heat in the low-boiling-point medium Rankine cycle in which the low-boiling-point medium has a higher boiling point, and may recover waste heat from lower air pressure parts of the at least two cooling air coolers as low-temperature waste heat in the low-boiling-point medium Rankine cycle in which the low-boiling-point medium has a lower boiling point.

It is possible to drive the respective low-boiling-point medium Rankine cycles by carrying out heat exchange between waste heat and low-boiling-point media having boiling points corresponding to the temperatures of individual waste heats in accordance with the temperatures of waste heat. Therefore, more effective use of waste heat becomes possible.

According to a seventh aspect of the present invention, in the waste heat recovery system of the first aspect, the waste heat recovery device may include one low-boiling-point medium Rankine cycle in which a low-boiling-point repeats a cycle consisting of condensation, evaporation, and circulation due to the recovered waste heat, the low-boiling-point medium Rankine cycle may recover waste heat from higher air pressure parts of the at least two cooling air coolers to a location in which the low-boiling point media has a higher temperature as high-temperature waste heat and may recover waste heat from lower air pressure parts of the at least two cooling air coolers to a location in which the low-boiling point media has a lower pressure.

It is possible to drive the respective low-boiling-point medium Rankine cycles by carrying out heat exchange between waste heat and low-boiling-point media at locations having temperatures corresponding to the temperatures of individual waste heats in accordance with the temperatures of the waste heat. Therefore, more effective use of waste heat becomes possible.

According to an eighth aspect of the present invention, in the waste heat recovery system of the first aspect, the waste heat recovery device may include: a low-boiling-point medium Rankine cycle in which low-boiling-point media each having a different boiling point repeat a cycle consisting of condensation, evaporation, and circulation, due to the recovered waste heat; and a Rankine cycle including a waste heat recovery boiler that heats water using exhaust gas from the turbine and a steam turbine that is driven using the water heated in the waste heat recovery boiler as an operating medium, may recover waste heat from higher air pressure parts of the at least two cooling air coolers as high-temperature waste heat in the Rankine cycle, and may recover waste heat from lower pressure parts of the at least two cooling air coolers as low-temperature waste heat in the low-boiling-point medium Rankine cycle.

Waste heat is recovered in the Rankine cycle or the low-boiling-point medium Rankine cycle depending on the temperature of waste heat, and the Rankine cycle or the low-boiling-point medium Rankine cycle is driven, whereby more effective use of waste heat becomes possible.

According to a ninth aspect of the present invention, in the waste heat recovery system of any one of the sixth to eighth aspects, the waste heat recovery device may include the low-boiling point medium Rankine cycle including an evaporator that evaporates low-boiling-point media using waste heat from the cooling air coolers by recovering the waste heat using heating media, a recovery line enabling the heating media that have recovered the waste heat in the cooling air coolers to flow toward the evaporator, a returning line which communicates with the recovery line and enables the heating media which have delivered the waste heat to the evaporator to flow toward the cooling air coolers, and a pump that circulates the heating media between the cooling air coolers and the evaporator through the recovery line and the returning line.

According to the above-described waste heat recovery system, it is possible to obtain power from waste heat from cooling air coolers using low-boiling-point medium Rankine cycles. Furthermore, since waste heat is recovered using heating media, it is possible to select various heating media having higher heat exchange efficiency in accordance with the temperature and the like of waste heat. In addition, liquid-form heating media are used, whereby it also becomes possible to reduce the sizes of devices such as heat exchangers that exchange the heat of waste heat between the cooling air coolers or the evaporator and the heating media. In addition, heat is exchanged using heating media, whereby the control of heat exchange becomes easy, and it is possible to more effectively use waste heat.

According to a tenth aspect of the present invention, there is provided the waste heat recovery system of the ninth aspect, in which the waste heat recovery device may include a bypass line which allows the recovery line and the returning line to communicate without the cooling air coolers and the evaporators being therebetween and thus enables the heating media to flow therebetween and a flow rate-adjusting valve that adjusts a flow rate of the heating media which flow through the bypass line.

The bypass line is provided, and the flow rate of heating media which flow through the bypass line is adjusted using the flow rate-adjusting valve, whereby it is possible to adjust the flow rate of heating media which flow toward the cooling air coolers and the evaporator, and it becomes possible to change the recovery amount of waste heat. As a result, it becomes possible to adjust the temperature of cooling air which is generated in the cooling air coolers.

According to an eleventh aspect of the present invention, in the waste heat recovery system of the tenth aspect, the waste heat recovery device may include a control device that adjusts the flow rate-adjusting valve so that a temperature of the cooling air which is generated in the cooling air coolers becomes constant.

Since it is possible to set the temperature of cooling air to be constant by adjusting the recovery amount of waste heat, it becomes possible to maintain the temperature of cooling air in an optimal state and improve the cooling effect on high-temperature components. In addition, it is possible to prevent the temperatures of high-temperature components from being excessively decreased and limit a decrease in the operation efficiency of the system.

According to a twelfth aspect of the present invention, the waste heat recovery system of the ninth to eleventh aspects, in which the waste heat recovery device may include a waste heat recovery boiler that heats water using exhaust gas from the turbine and may use the water in the waste heat recovery boiler as the heating medium.

Waste heat from the cooling air coolers is recovered using water in the waste heat recovery boiler as a heating medium, whereby it becomes possible to reduce costs by sharing facilities. That is, it is possible to make the waste heat recovery system function as a part of a cogeneration system or a combined cycle.

According to a thirteenth aspect of the present invention, in the waste heat recovery system of any one of the second to twelfth aspects, the waste heat recovery device may produce mixed wasted heat by mixing waste heat from part or all of the at least two cooling air coolers, may recover waste heat having a higher temperature among the mixed waste heat and waste heat which is not mixed with the mixed waste heat as high-temperature waste heat, and may recover waste heat having a lower temperature among the mixed waste heat and waste heat which is not mixed with the mixed waste heat as low-temperature waste heat.

Waste heat from part or all of the cooling air coolers are mixed together and recovered, whereby waste heat temperatures can be adjusted, and convenience in the use of waste heat further improves. In addition, the recovery of waste heat becomes easy, and the waste heat recovery device can be simplified compared with a case in which waste heat are not mixed together and are individually recovered.

According to a fourteenth aspect of the present invention, in the waste heat recovery system of the thirteenth aspect, in which the waste heat recovery device may generate the mixed waste heat by causing heating media to flow in parallel through part or all of the at least two cooling air coolers.

In a case in which the temperature difference between waste heat recovered using the cooling air coolers is small, it is possible to simplify the structures of waste heat recovery systems while maintaining the recovery efficiency of waste heat by mixing the waste heat together.

According to a fifteenth aspect of the present invention, in the waste heat recovery system of the thirteenth aspect, part or all of the at least two cooling air coolers capable of recovering waste heat having a higher temperature may be high-temperature side cooling air cooler, part or all of the at least two cooling air coolers, the cooling air cooler capable of recovering waste heat having a lower temperature may be low-temperature side cooling air cooler, and the waste heat recovery device may cause heating media to flow in series from the low-temperature side cooling air cooler to the high-temperature side cooling air cooler, thereby generating mixed waste heat.

Waste heat is recovered in series in an incremental order of temperature of the waste heat, whereby it is possible to improve the recovery efficiency of waste heat.

According to a sixteenth aspect of the present invention, in the waste heat recovery system of the thirteenth aspect, the waste heat recovery device may generate the mixed waste heat by causing heating media to flow in parallel through part or all of the at least two cooling air coolers and generates mixed waste heat by flowing the heating media through a parallel cooling air cooler group including part or all of the at least two cooling air coolers through which the heating media flow in parallel and flowing in series the heating media through the parallel cooling air cooler group and the cooling air cooler not in the parallel cooling air cooler group.

The heating media are caused to flow both in parallel and in series, whereby it is possible to improve the recovery efficiency of waste heat regardless of the degree of the temperature difference between cooling air coolers.

According to a seventeenth aspect of the present invention, a gas turbine plant includes: the waste heat recovery system according to any one of the first to sixteenth aspects; and the gas turbine including the compressor that compresses air, the combustor that generates combustion gas by combusting fuel in the compressed air, and the turbine that is driven using the combustion gas.

According to the above-described gas turbine plant, a waste heat recovery system is provided, whereby it is possible to generate cooling air while reducing the power of the compressor by means of bleeding in the compressor. In addition, bleeding is carried out in places having different pressures in the compressor, and thus it is possible to generate cooling air having different pressures and temperatures. Therefore, it is possible to recover waste heat having different temperatures from individual cooling air coolers using the waste heat recovery device, and it becomes possible to use waste heat in accordance with the temperatures thereof.

According to an eighteenth aspect of the present invention, a waste heat recovery method includes: a bleeding step of bleeding air from a plurality of places having different pressures in a compressor in a gas turbine including the compressor that compresses air, a combustor that generates combustion gas by combusting fuel in the compressed air, and a turbine that is driven using the combustion gas; a cooling step of cooling the air bled respectively from the plurality of places, thereby generating cooling air that cools high-temperature components; and a waste heat recovery step of recovering waste heat generated when cooling air generated in at least two of the plurality of places corresponding to plurality of bleeding places.

According to the above-described waste heat recovery method, bleeding is carried out in places having different pressures in compressor, and thus it is possible to generate cooling air having different pressures and temperatures. In addition, it becomes possible to recover waste heat having different temperatures from individual cooling air coolers, and it becomes possible to use waste heat in accordance with the temperatures thereof.

According to a nineteenth aspect of the present invention, in the waste heat recovery method of the eighteenth aspect, in the waste heat recovery step, waste heat obtained by cooling the air bled from a higher pressure place of the at least two places may be recovered to a higher temperature heating medium as high-temperature waste heat, and waste heat obtained by cooling the air bled from a lower pressure place of the at least two places may be recovered to a lower temperature heating medium as low-temperature waste heat.

Waste heat from the respective cooling air coolers are individually recovered in accordance with the temperatures of heating media, whereby the effective use of waste heat becomes possible.

According to a twentieth aspect of the present invention, in the waste heat recovery method of the eighteenth aspect, in the waste heat recovery step, waste heat obtained by cooling the air bled from a higher pressure place of the at least two places may be recovered to a portion with a higher water temperature of a waste heat recovery boiler that heats water using exhaust gas from the turbine as high-temperature waste heat, and waste heat obtained by cooling the air bled from a lower pressure place of the at least two places may be recovered to a portion with a lower water temperature of the waste heat recovery boiler as low-temperature waste heat.

Waste heat from the each of cooling air coolers is individually recovered in accordance with the temperatures of water in the waste heat recovery boiler, whereby effective use of waste heat becomes possible.

According to a twenty-first aspect of the present invention, in the waste heat recovery method of the eighteenth aspect, in the waste heat recovery step, waste heat obtained by cooling the air bled from a higher pressure place of the at least two places may be recovered to a portion with a higher water pressure of the waste heat recovery boiler as high-temperature waste heat, and waste heat obtained by cooling the air bled from a lower pressure place of the at least two places may be recovered to a portion with a lower water pressure of the waste heat recovery boiler as low-temperature waste heat.

Waste heat from the each of the cooling air coolers is individually recovered in accordance with the pressures of water in the waste heat recovery boiler, whereby the effective use of waste heat becomes possible.

According to a twenty-second aspect of the present invention, in the waste heat recovery method of the eighteenth aspect, in the waste heat recovery step, the waste heat may be recovered in a plurality of low-boiling-point medium Rankine cycles in which low-boiling-point media having different boiling points respectively repeat a cycle consisting of condensation, evaporation and circulation, waste heat obtained by cooling the air bled from a higher pressure place of the at least two places may be recovered as high-temperature waste heat in the low-boiling-point medium Rankine cycle in which the low-boiling-point medium has a higher boiling point, and waste heat obtained by cooling the air bled from a lower pressure place of the at least two places may be recovered as low-temperature waste heat in the low-boiling-point medium Rankine cycle in which the low-boiling-point medium has a lower boiling point.

The respective low-boiling-point medium Rankine cycles are driven by carrying out heat exchange between waste heat and low-boiling-point media having boiling points corresponding to the temperatures of individual waste heats in accordance with the temperature of waste heat, whereby more effective use of waste heat becomes possible.

According to a twenty-third aspect of the present invention, in the waste heat recovery method of the eighteenth aspect, in the waste heat recovery step, the waste heat may be recovered in one low-boiling-point medium Rankine cycle in which low-boiling-point media each having different boiling points repeat a cycle consisting of condensation, evaporation, and circulation, waste heat obtained by cooling the air bled from a higher pressure place of the at least two places may be recovered to a location in which the low-boiling-point media have a higher temperature in the low-boiling-point medium Rankine cycle as high-temperature waste heat, and waste heat obtained by cooling the air bled from a lower pressure place of the at least two places may be recovered to a location in which the low-boiling-point media have a lower temperature in the low-boiling-point medium Rankine cycle as low-temperature waste heat.

Heat is exchanged between waste heat and the low-boiling-point media at locations having temperatures corresponding to the temperatures of the waste heat, whereby it is possible to further improve the use efficiency of waste heat.

According to a twenty-fourth aspect of the present invention, in the waste heat recovery method of the eighteenth aspect, in the waste heat recovery step, higher pressure waste heat obtained by cooling the air bled from the at least two places may be recovered as high-temperature waste heat in a Rankine cycle including a waste heat recovery boiler that heats water using exhaust gas from the turbine and a steam turbine that is driven using the water heated in the waste heat recovery boiler as an operating medium, and lower pressure waste heat obtained by cooling the air bled from the at least two places may be recovered as low-temperature waste heat in a low-boiling-point Rankine cycle in which low-boiling-point media repeat a cycle consisting of condensation, evaporation, and circulation.

Waste heat is recovered in the Rankine cycle or the low-boiling-point medium Rankine cycle depending on the temperature of waste heat, and the Rankine cycle or the low-boiling-point medium Rankine cycle is driven, whereby more effective use of waste heat becomes possible.

According to a twenty-fifth aspect of the present invention, in the waste heat recovery method of any one of the twenty-second to twenty-fourth aspects, in the waste heat recovery step, the waste heat may be recovered in the low-boiling-point medium Rankine cycle using a heating medium different from the low-boiling-point media.

According to the above-described waste heat recovery method, it is possible to select heating media having a higher heat exchange efficiency in a various manner in accordance with the temperature and the like of waste heat. In addition, heat is exchanged using heating media, whereby the control of heat exchange becomes easy, and it is possible to more effectively use heat air.

According to a twenty-sixth aspect of the present invention, in the waste heat recovery method of the twenty-fifth aspect, in the waste heat recovery step, a recovery amount of the waste heat may be adjusted by adjusting a flow rate of the heating media so that a temperature of the cooling air is constant.

According to the above-described waste heat recovery method, since it is possible to set the temperature of cooling air to be constant by adjusting the recovery amount of waste heat, it becomes possible to maintain the temperature of cooling air in an optimal state and improve the cooling effect on high-temperature components. In addition, it is possible to prevent the temperatures of high-temperature components from being excessively decreased.

According to a twenty-seventh aspect of the present invention, in the waste heat recovery method of any one of the eighteenth to twenty-sixth aspects, in the waste heat recovery step, mixed waste heat may be produced by mixing part or all of the waste heat obtained by cooling the air bled from the at least two places, waste heat having a higher temperature among the mixed waste heat and waste heat which are not mixed with the mixed waste heat may be recovered as high-temperature waste heat, and waste heat having a lower temperature among the mixed waste heat and waste heat which are not mixed with the mixed waste heat may be recovered as low-temperature waste heat.

Waste heat from part or all of the cooling air coolers are mixed together and recovered, whereby waste heat temperatures can be adjusted, and convenience in the use of waste heat further improves. In addition, the recovery of waste heat becomes easy.

According to a twenty-eighth aspect of the present invention, in the waste heat recovery method of the twenty-seventh aspect, in the waste heat recovery step, part or all of the waste heat obtained by cooling the air bled from the at least two places may be recovered in parallel, and the mixed waste heat may be generated.

In a case in which the temperature difference between waste heat obtained by cooling the air from the respective bleeding places is small, it is possible to simplify devices necessary for the waste heat recovery step while maintaining the recovery efficiency of waste heat by mixing the waste heat together.

According to a twenty-ninth aspect of the present invention, there is provided the waste heat recovery method of the twenty-seventh aspect, in which, in the waste heat recovery step, part or all of the waste heat obtained by cooling the air bled in the at least two places may be recovered in series from waste heat having a lower temperature to waste heat having a higher temperature in order, and the mixed waste heat may be generated.

Waste heat is recovered in series in an incremental order of temperature, whereby it is possible to improve the recovery efficiency of waste heat.

According to a thirtieth aspect of the present invention, in the waste heat recovery method of the twenty-seventh aspect, in the waste heat recovery step, when part or all of the waste heat obtained by cooling the air bled from the at least two places is recovered in parallel, and the waste heat recovered in parallel are considered to be a parallel waste heat group, the parallel waste heat group and waste heat other than the parallel waste heat group may be recovered in series, and the mixed waste heat may be generated.

Waste heat is jointly recovered in parallel and in series, whereby it is possible to improve the recovery efficiency of waste heat regardless of the degree of the temperature difference between waste heat obtained by cooling air from individual bleeding places.

According to a thirty first aspect of the present invention, in an installation method for waste heat recovery systems, the waste heat recovery system according to any one of the first to sixteenth aspects is installed in the gas turbine.

The waste heat recovery system is installed additionally in the gas turbine as described above, whereby it is possible to effectively use waste heat from cooling air coolers that have not been used in existing gas turbine plants.

Advantageous Effects of Invention

According to the above-described waste heat recovery system, gas turbine plant, waste heat recovery method, and installation method for waste heat recovery systems, it becomes possible to effectively use waste heat obtained by bleeding and cooling air from a plurality of places having different pressures in compressors, and it is possible to increase heat usage efficiency.

DESCRIPTION OF EMBODIMENTS

Hereinafter, a variety of embodiments of a gas turbine plant 1 according to the present invention will be described using the accompanying drawings.

First Embodiment

Figure 1:
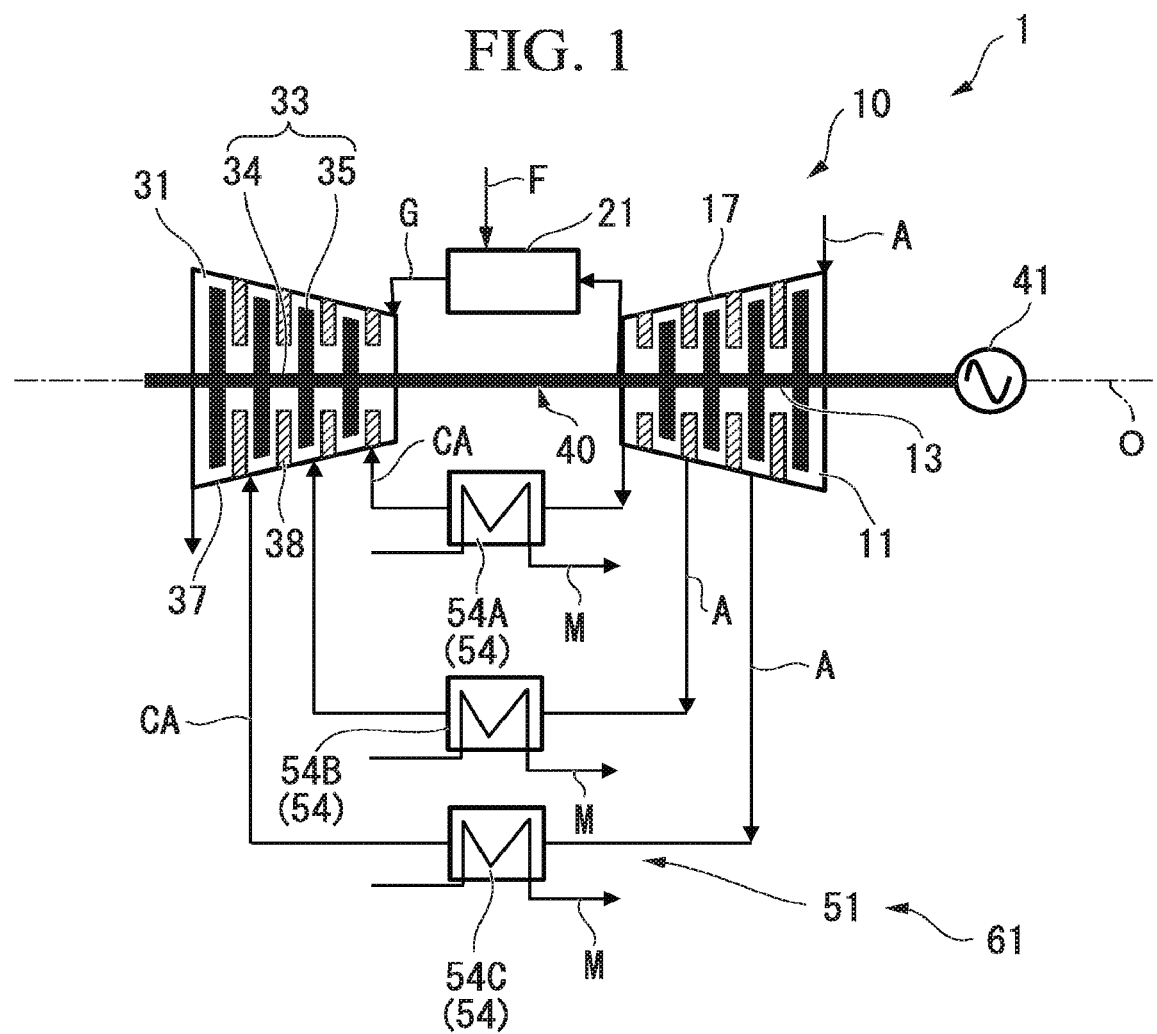
FIG. 1 is a system diagram of a gas turbine plant in a first embodiment of the present invention.

A first embodiment of the gas turbine plant 1 of the present invention will be described with reference to FIG. 1.

The gas turbine plant 1 of the present embodiment includes a gas turbine 10, a generator 41 that generates power by the driving of the gas turbine 10, cooling air coolers 54 that cool bleed air from the gas turbine 10, and a waste heat recovery system 61 having a waste heat recovery device 51 that recovers waste heat from the cooling air coolers 54.

The gas turbine 10 includes a compressor 11 that compresses air A, a combustor 21 that generates combustion gas G by combusting a fuel F in the air A compressed using the compressor 11, and a turbine 31 that is driven using the combustion gas G having a high temperature and a high pressure.

The compressor 11 has a compressor rotor 13 that rotates around a shaft line O and a compressor casing 17 that rotatably covers the compressor rotor 13.

The turbine 31 has a turbine rotor 33 that rotates around the shaft line O due to the combustion gas G from the combustor 21 and a turbine casing 37 that rotatably covers the turbine rotor 33.

The turbine rotor 33 has a rotor shaft 34 that extends in a shaft direction parallel to the shaft line O and turbine blades 35 arranged in multiple stages that are fixed to the outer circumference of the rotor shaft 34. In addition, turbine vanes 38 arranged in multiple stages are fixed to the inner circumferential surface of the turbine casing 37. A combustion gas passage which the combustion gas G from the combustor 21 flows through is formed between the inner circumferential surface of the turbine casing 37 and the outer circumferential surface of the rotor shaft 34. A cooling air passage (not shown) through which cooling air CA flows is formed in the rotor shaft 34 and the turbine vanes 38.

The combustor 21 is fixed to the turbine casing 37. Since the turbine rotor 33 and the compressor rotor 13 rotate around the same shaft line O, the turbine rotor 33 and the compressor rotor 13 are coupled with each other and thus form a gas turbine rotor 40. A rotor of the above-described generator 41 is connected to this gas turbine rotor 40.

The waste heat recovery device 51 recovers waste heat from the cooling air coolers 54 by introducing a heating medium M into the cooling air coolers 54. Examples of the heating medium M include liquids such as water, high-boiling-point oil, and liquid metals and gases such as water vapor, carbon dioxide, and helium.

In the cooling air coolers 54, part of the air A compressed using the compressor 11 is bled, is cooled by exchanging heat between the air and the heating medium M such as water, and is sent to the above-described cooling air passage in the turbine 31. In addition, in the present embodiment, the air A is bled from a plurality of places having different pressure in the compressor 11, and the air A bled from the respective places is cooled, thereby generating cooling air CA.

In more detail, the air is bled from three places of an outlet (in the turbine 31 side) of the compressor 11, an intermediate location in the outlet side of the compressor 11, and an intermediate location in the inlet side of the compressor 11.

In addition, the cooling air coolers 54 are each provided so as to correspond to the respective bleedings. The cooling air cooler that corresponds to bleeding at the outlet of the compressor 11 will be referred to as a first cooler 54A, the cooling air cooler that corresponds to bleeding at the intermediate location in the outlet side will be referred to as a second cooler 54B, and the cooling air cooler that corresponds to bleeding at the intermediate location in the inlet side will be referred to as a third cooler 54C.

For example, the cooling air CA generated in the first cooler 54A, the cooling air CA generated in the second cooler 54B, and the cooling air CA generated in the third cooler 54C are sent to the turbine rotor 33, the second-stage turbine vane in the turbine 31, and the third-stage turbine vane in the turbine 31 respectively through the above-described cooling air passage.

Therefore, the cooling air CA generated in the first cooler 54A has the highest pressure and the highest temperature, and the cooling air CA generated in the third cooler 54C has the lowest pressure and the lowest temperature.

The cooling air CA generated in the respective cooling air coolers 54 may be used to cool, for example, the combustor 21 or may be used to cool the turbine blades 35 and the turbine vanes 38 in other stages, but the use of the cooling air is not limited to the above-described cases.

According to the above-described gas turbine plant 1, the compressor 11 in the gas turbine 10 compresses the air A and supplies the compressed air A to the combustor 21. In addition, the combustor 21 is also supplied with the fuel F. In the combustor 21, the fuel F is combusted in the compressed air A, thereby generating the combustion gas G having a high temperature and a high pressure. This combustion gas G is sent to the combustion gas passage in the turbine 31 form the combustor 21 and is used to rotate the turbine rotor 33. Due to the rotation of the turbine rotor 33, the generator 41 that is connected to the gas turbine 10 generates power.

Figure 2:
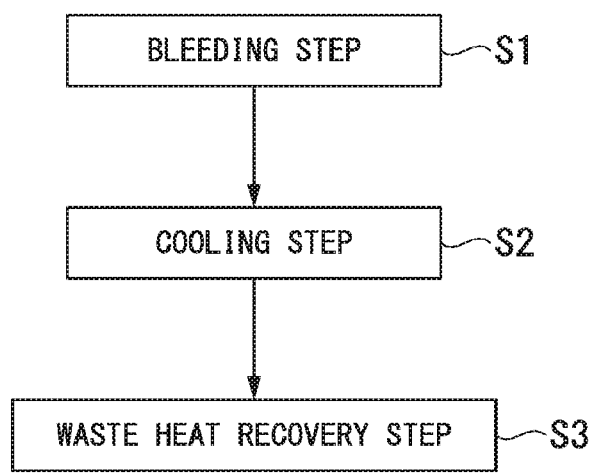
FIG. 2 is a flowchart showing an order of a waste heat recovery method in the gas turbine plant in the first embodiment of the present invention.

In addition, since the waste heat recovery system 61 is provided in the gas turbine plant 1, it is possible to reduce the power of the compressor 11 by means of bleeding in the compressor 11. Particularly, the air A is bled from a plurality of places having different pressures in the compressor 11 (bleeding step S1, refer to FIG. 2), whereby it is possible to limit the efficiency being decreased in the compressor 11 compared with a case in which bleeding is carried out at only one place.

In addition, since bleeding is carried out at places having different pressures in the compressor 11, and the bled air is individually cooled (cooling step S2, refer to FIG. 2), it is possible to generate cooling air CA having different pressures and temperatures. Therefore, it is possible to recover waste heat having different temperatures in the first cooler 54A, the second cooler 54B, and the third cooler 54C using the waste heat recovery device 51 (waste heat recovery step S3, refer to FIG. 2), and it becomes possible to use heat in accordance with exhaust gas temperatures.

According to the gas turbine plant 1 of the present embodiment, waste heat generated during the cooling of the air A is recovered using the waste heat recovery device 51. Therefore, waste heat from the cooling air coolers 54 is not discharged outside, and waste heat can be effectively used, and thus it is possible to increase heat usage efficiency.

In the present embodiment, all of the waste heat from the first cooler 54A, the second cooler 54B, and the third cooler 54C are recovered in the waste heat recovery device 51, but waste heat from the cooling air coolers 54 in at least two places may be recovered. That is, it is allowed to provide only two coolers of the first cooler 54A and the second cooler 54B as the cooling air coolers 54 and recover waste heat from the first cooler 54A and the second cooler 54B.

In addition, in a case in which, due to the low temperature of waste heat from the third cooler 54C, the value of using the waste heat is small, and it is inappropriate to recover the waste heat from the third cooler 54C by providing pipes and the like in terms of costs, it is also allowed to recover waste heat from the first cooler 54A and the second cooler 54B among the first cooler 54A, the second cooler 54B, and the third cooler 54C and discharge waste heat from the third cooler 54C to the outside of the gas turbine plant 1.

Second Embodiment

Figure 3:
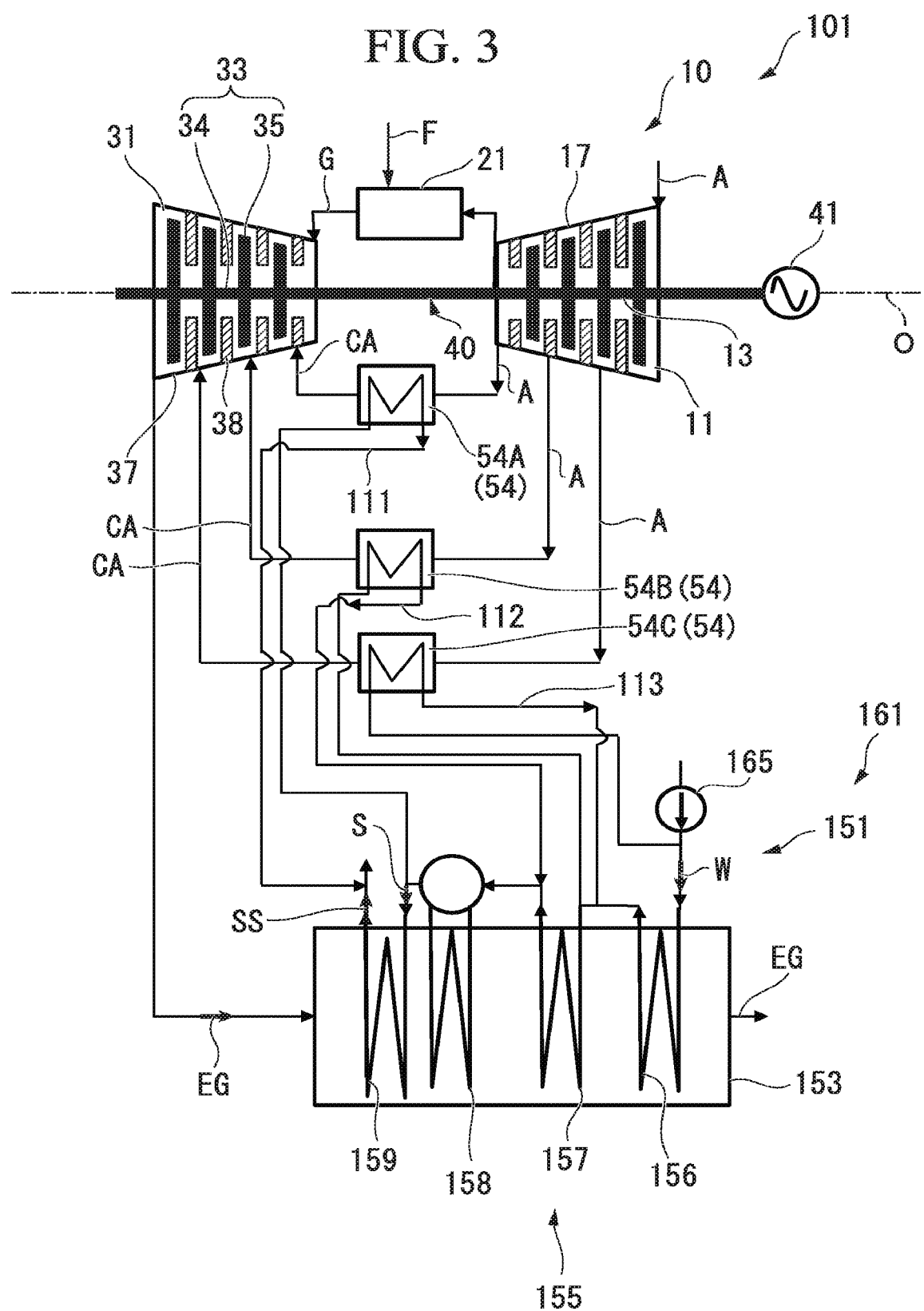
FIG. 3 is a system diagram of a gas turbine plant in a second embodiment of the present invention.

Next, a second embodiment of a gas turbine plant 101 according to the present invention will be described with reference to FIG. 3.

In the gas turbine plant 101 of the present embodiment, in addition to the constitution of the gas turbine plant 1 in the first embodiment, a waste heat recovery device 151 in a waste heat recovery system 161 further has a waste heat recovery boiler 153 and a water supply pump 165 that supplies water to the waste heat recovery boiler 153.

The waste heat recovery boiler 153 generates steam S using the heat of the combustion gas G used to drive the turbine 31, that is, exhaust gas EG exhausted from the gas turbine 10.

This waste heat recovery boiler 153 has a steam generating unit 155 that generates the steam S from water supplied using the water supply pump 165.

This steam generating unit 155 has a first economizer 156 that heats water W, a second economizer 157 that further heats the water W that has been heated using the first economizer 156, an evaporator 158 that turns the water W that has been heated using the second economizer 157 into steam S, and a superheater 159 that superheats the steam S generated using the evaporator 158, generates superheated steam SS, and discharge the superheated steam to the outside.

The constituent elements of the steam generating unit 155 are arrange in an order of the superheater 159, the evaporator 158, the second economizer 157, and the first economizer 156 from the turbine 31 side to the downstream side of the exhaust gas EG.

A first recovery line 111 is provided in the waste heat recovery device 151. Due to the first recovery line 111, after the water (steam S) is introduced into the first cooler 54A from the outlet of the evaporator 158 (inlet of the superheater 159), the water W (steam S) from which waste heat from the first cooler 54A has been recovered is introduced into the outlet of the superheater 159.

Similarly, in the waste heat recovery device 151, a second recovery line 112 is provided on the upper steam side of the first recovery line 111 in the waste heat recovery boiler 153. Due to the second recovery line 112, after the water W is introduced into the second cooler 54B from the outlet of the first economizer 156 (outlet of the second economizer 157), the water W from which waste heat from the second cooler 54B has been recovered is introduced into the outlet of the second economizer 157 (inlet of the evaporator 158).

Similarly, in the waste heat recovery device 151, a third recovery line 113 is provided on the upper steam side of the second recovery line 112 in the waste heat recovery boiler 153. Due to the third recovery line 113, after the water is introduced into the third cooler 54C from the inlet of the first economizer 156, the water from which waste heat from the third cooler 54C has been recovered is introduced into the outlet of the first economizer 156 (inlet of the second economizer 157).

As described above, among the cooling air coolers 54, waste heat from the first cooler 54A which has a higher temperature (high-temperature waste heat) is recovered to a portion in which the water W has a higher temperature in the waste heat recovery boiler 153, and, among the cooling air coolers 54, waste heat from the third cooler 54C which has a lower temperature (low-temperature waste heat) is recovered to a portion in which the water (or the steam S) has a lower temperature in the waste heat recovery boiler 153.

According to the gas turbine plant 101 of the present embodiment, since the waste heat recovery boiler 153 is provided, it is possible to effectively use the exhaust gas EG from the gas turbine 10 and individually recover waste heat from each of the cooling air coolers 54 in accordance with the temperatures of the water W (steam S) in the waste heat recovery boiler 153.

Therefore, it is possible to effectively use waste heat from the cooling air coolers 54, and it becomes possible to generate the exhaust gas EG and superheated steam SS using waste heat and use the generated superheated steam SS in a variety of ways.

In the present embodiment, the first recovery line 111, the second recovery line 112, and the third recovery line 113 are provided in the above-described locations, but the recovery lines are not limited to be provided in the above-described locations. That is, the first recovery line 111, the second recovery line 112, and the third recovery line 113 may be provided at locations so that waste heat having a higher temperature is recovered to a portion of the waste heat recovery boiler 153 in which the water W (steam S, superheated steam SS) has a higher temperature, and waste heat having a lower temperature is recovered to a portion of the waste heat recovery boiler 153 in which the water (stem S, superheated steam SS) has a lower temperature.

Figure 4:
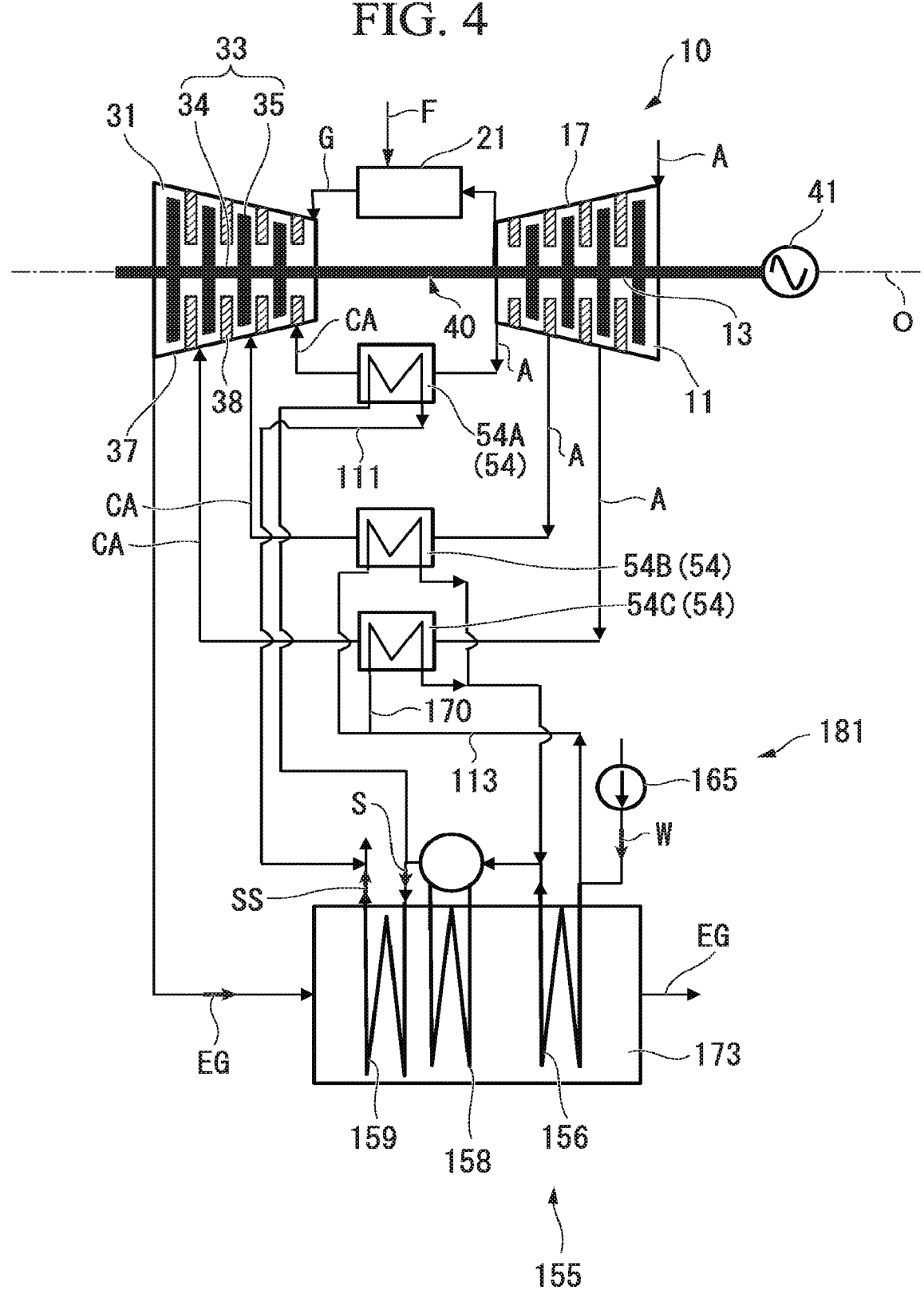
FIG. 4 is a system diagram of a gas turbine plant in a modification example of the second embodiment of the present invention.

As shown in FIG. 4, in the present embodiment, it is also allowed to mix waste heat from the second cooler 54B and the third cooler 54C and introduce the mixed waste heat into a waste heat recovery boiler 173.

Specifically, the second economizer 157 is not provided in the waste heat recovery boiler 173, and, in a waste heat recovery device 181, the above-described second recovery line 112 is not provided, and a branching line 170 is provided so that water flows into the second cooler 54B and the third cooler 54C in parallel through the third recovery line 113. In addition, waste heat from the second cooler 54B and the third cooler 54C are recovered in the waste heat recovery boiler 173 in a form of mixed waste heat.

In the present embodiment, since waste heat from the first cooler 54A has a lower temperature than the mixed waste heat from the second cooler 54B and the third cooler 54C, it is necessary to recover the mixed waste heat to a portion having a lower temperature (or pressure) in the waste heat recovery boiler 173.

In the above-described gas turbine plant 101, waste heat from the cooling air coolers 54 are mixed together and recovered, whereby waste heat temperatures can be adjusted, and convenience in the use of waste heat is further enhanced. In addition, the recovery of waste heat becomes easy, and the waste heat recovery device 181 can be simplified compared with a case in which waste heat is not mixed together and are individually recovered.

In addition, in a case in which the temperature difference between waste heat from the second cooler 54B and the third cooler 54C is small, it is possible to simplify the structure of the waste heat recovery system 161 while maintaining the recovery efficiency of waste heat by mixing the waste heat together.

In FIG. 4, waste heat from the second cooler 54B and the third cooler 54C are recovered in parallel. However, the third recovery line 113 may also be provided so that the water W (steam S, superheated steam SS) flows from the third cooler 54C to the second cooler 54B in series so that waste heat from the third cooler 54C which is waste heat having a lower temperature is recovered first and then waste heat from the second cooler 54B which is waste heat having a higher temperature is mixed thereinto (refer to FIG. 11). In this case, waste heat is recovered from waste heat having a low temperature to waste heat having a high temperature in order, whereby it is possible to improve the recovery efficiency of waste heat. Particularly, in a case in which there is a temperature difference between waste heat from the second cooler 54B and waste heat from the third cooler 54C, it is effective to provide the third recovery line.

Figure 12:
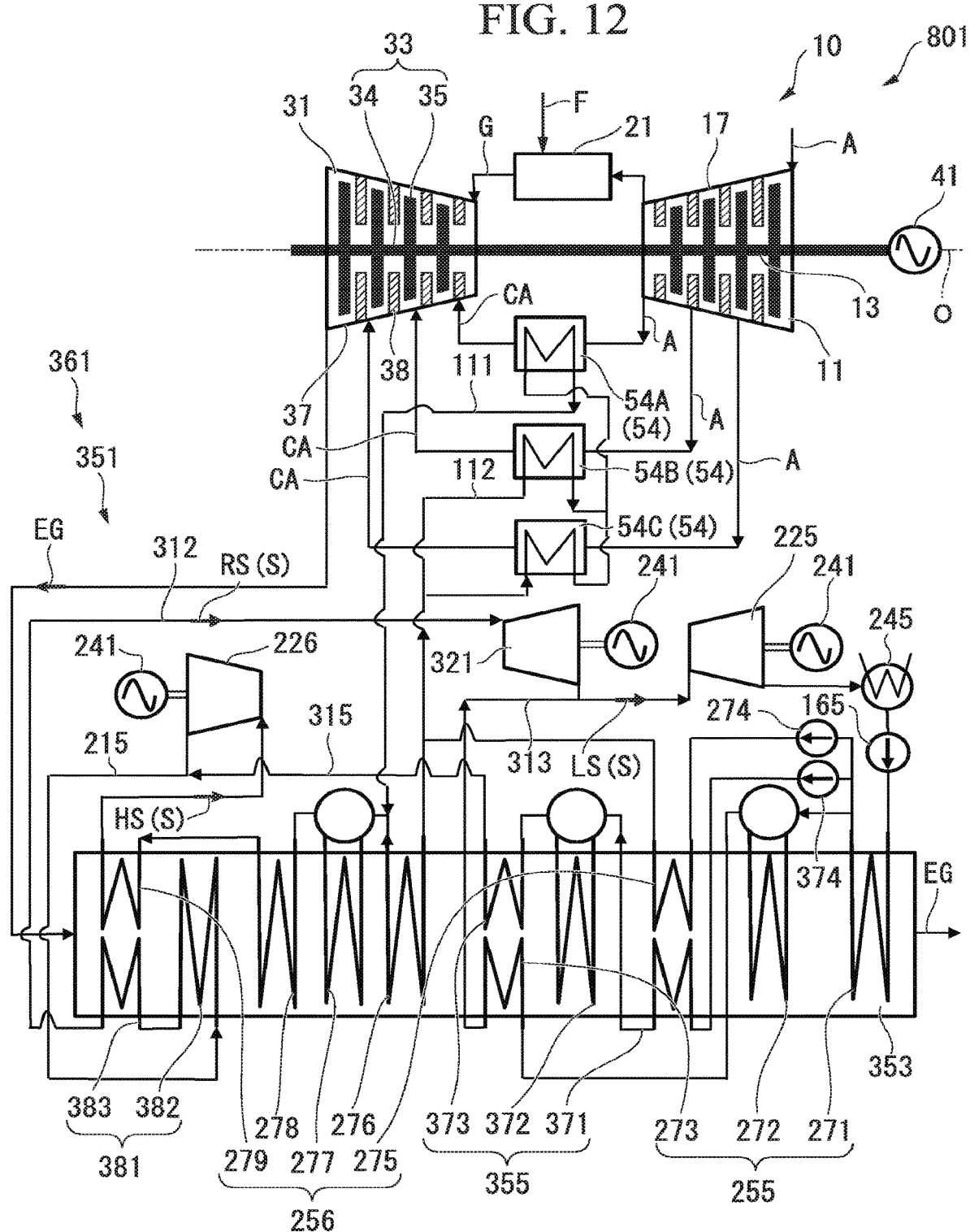
FIG. 12 is a system diagram of a gas turbine plant in a ninth embodiment of the present invention.

In addition, in a case in which waste heat is recovered in parallel as described above, waste heat may be recovered in series from time to time (refer to FIG. 12). That is, mixed waste heat may be recovered by appropriately combining parallel recovery and serial recovery in accordance with the temperature difference between waste heat from each of the cooling air coolers 54.

Furthermore, in a case in which waste heat from the first cooler 54A, the second cooler 54B, and the third cooler 54C have the same temperature, all of the waste heat from the cooling air coolers 54 may be mixed together so as to produced mixed waste heat.

Third Embodiment

Figure 5:
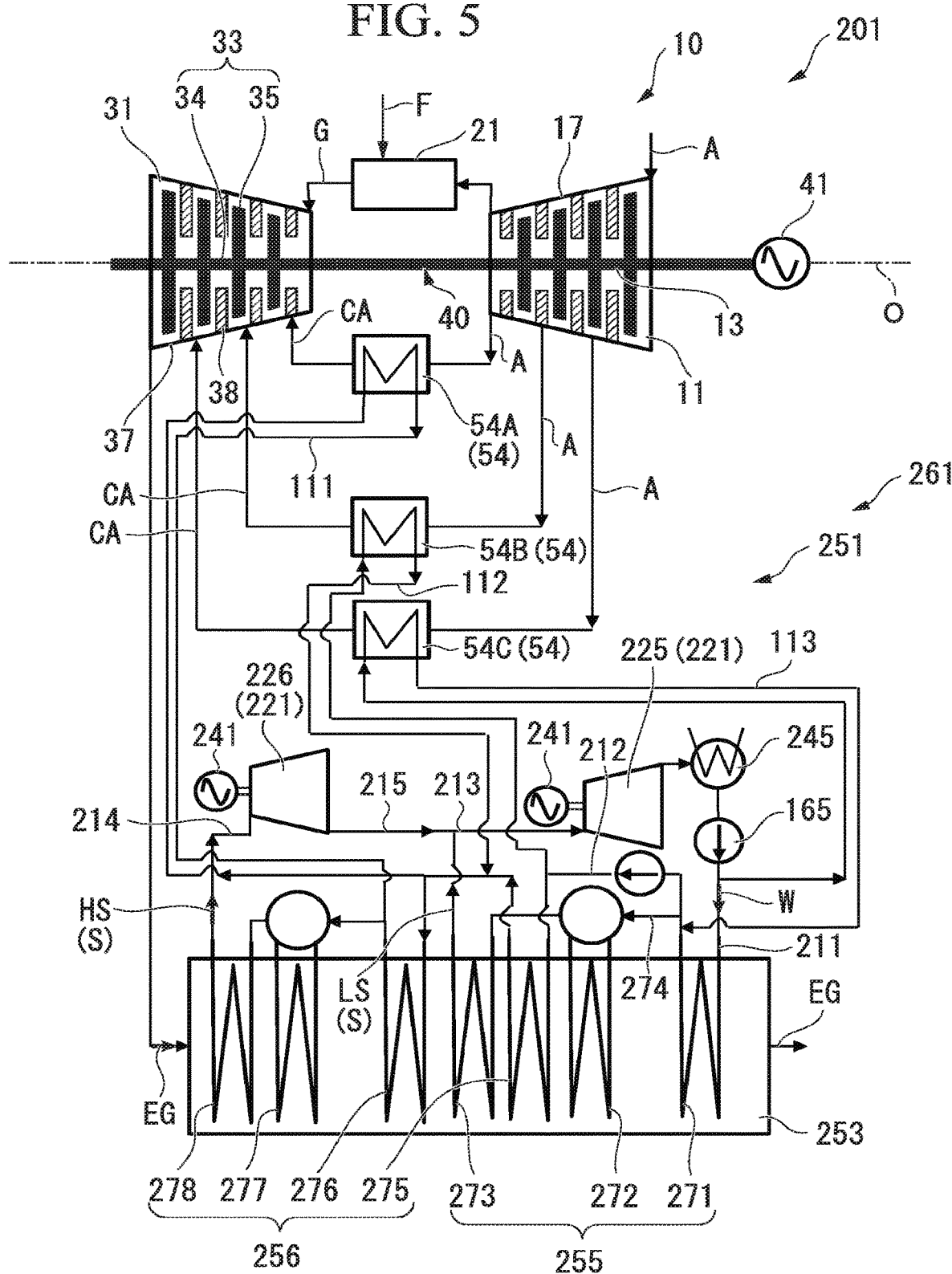
FIG. 5 is a system diagram of a gas turbine plant in a third embodiment of the present invention.

Next, a third embodiment of a gas turbine plant 201 according to the present invention will be described with reference to FIG. 5.

In the gas turbine plant 201 of the present embodiment, in addition to the constitution of the gas turbine plant 101 in the second embodiment, a waste heat recovery device 251 in a waste heat recovery system 261 further has, in addition to a waste heat recovery boiler 253 and the water supply pump 165, steam turbines 221 that are driven using steam S generated in the waste heat recovery boiler 253, generators 241 that generate power by the driving of the steam turbines 221, and a steam condenser 245 that returns the steam S used to drive the steam turbine 221 to water.

In the present embodiment, the water supply pump 165 is provided between the steam condenser 245 and the waste heat recovery boiler 253 so that water W in the steam condenser 245 returns to the waste heat recovery boiler 253.

In addition, the waste heat recovery boiler 253 has a low-pressure steam generating unit 255 that generates low-pressure steam LS and a high-pressure steam generating unit 256 that generates high-pressure steam HS.

As the steam turbines 221, two steam turbines of a low-pressure steam turbine 225 and a high-pressure steam turbine 226 are provided.

The generators 241 are provided to a total of two steam turbines 221 of the low-pressure steam turbine 225 and the high-pressure steam turbine 226, but a common generator 241 may be provided to the low-pressure steam turbine 225 and the high-pressure steam turbine 226.

The low-pressure steam generating unit 255 has a low-pressure economizer 271 that heats water W, a low-pressure evaporator 272 that turns the water W that has been heated using the low-pressure economizer 271 into steam S, and a low-pressure superheater 273 that superheats the steam S generated using the low-pressure evaporator 272 and generates the low-pressure steam LS.

The high-pressure steam generating unit 256 has a high-pressure water supply pump 274 that pressurizes the water W that has been heated using the low-pressure economizer 271, a first high-pressure economizer 275 that heats the water W that has been pressurized using the high-pressure water supply pump 274, a second high-pressure economizer 276 that further heats the water W that has been heated using the first high-pressure economizer 275, a high-pressure evaporator 277 that turns the water W that has been heated using the second high-pressure economizer 276 into steam S, and a high-pressure superheater 278 that superheats the steam S generated using the high-pressure evaporator 277 and generates the high-pressure steam HS.

The constituent elements of the high-pressure steam generating unit 256 and the low-pressure steam generating unit 255 are arrange in an order of the high-pressure superheater 278, the high-pressure evaporator 277, the second high-pressure economizer 276, the low-pressure superheater 273, the first high-pressure economizer 275, the low-pressure evaporator 272, and the low-pressure economizer 271 from the turbine 31 toward the downstream side of the exhaust gas EG.

The steam condenser 245 and the low-pressure economizer 271 are connected to the water supply line 211. The above-described water supply pump 165 is provided in this water supply line 211. The low-pressure economizer 271 and the first high-pressure economizer 275 are connected to the high-pressure water supply line 212. The above-described high-pressure water supply pump 274 is provided in this high-pressure water supply line 212.

The low-pressure superheater 273 and the inlet of the low-pressure steam turbine 225 are connected to each other in a low-pressure steam line 213 that sends the low-pressure steam LS from the low-pressure superheater 273 to the low-pressure steam turbine 225. The outlet of the low-pressure steam turbine 225 and the steam condenser 245 are connected to each other so that the low-pressure steam LS used to drive the low-pressure steam turbine 225 is supplied to the steam condenser 245. The high-pressure superheater 278 and the inlet of the high-pressure steam turbine 226 are connected to each other in a high-pressure steam line 214 that sends the high-pressure steam HS from the high-pressure superheater 278 to the high-pressure steam turbine 226. A high-pressure steam recovery line 215 is connected to the outlet of a high-pressure steam turbine 226. This high-pressure steam recovery line 215 is joined to the low-pressure steam line 213.

In addition, the first recovery line 111 is provided so that the water W is introduced from the outlet of the first high-pressure economizer 275 (the inlet of the second high-pressure economizer 276) into the first cooler 54A and then the water W from which waste heat from the first cooler 54A has been recovered is introduced into the outlet of the second high-pressure economizer 276 (the inlet of the high-pressure evaporator 277).

The second recovery line 112 is provided so that water is introduced from the inlet of the first high-pressure economizer 275 (the outlet of the low-pressure economizer 271) into the second cooler 54B and then the water W from which waste heat from the second cooler 54B has been recovered is introduced into the outlet of the first high-pressure economizer 275 (the inlet of the second high-pressure economizer 276).

The third recovery line 113 is provided so that water is introduced from the inlet of the low-pressure economizer 271 (on the downstream side of the water supply pump 165) into the third cooler 54C and then the water W from which waste heat from the third cooler 54C has been recovered is introduced into the outlet of the low-pressure economizer 271 (which is the inlet of the low-pressure evaporator 272 and is on the upstream side of the high-pressure water supply pump 274).

As described above, in the waste heat recovery device 251, waste heat from the first cooler 54A having a higher temperature among the cooling air coolers 54 is recovered to a portion in which the water W has a higher temperature in the waste heat recovery boiler 253, and waste heat from the third cooler 54C having a lower temperature among the cooling air coolers 54 is recovered to a portion in which the water W has a lower temperature in the waste heat recovery boiler 253.

According to the gas turbine plant 201 of the present embodiment, the waste heat recovery system 261 has a so-called Rankine cycle including the waste heat recovery boiler 253, the steam turbine 221, and the like as constituent elements. Therefore, waste heat from the cooling air coolers 54 are recovered to individual locations having different temperatures in the Rankine cycle in accordance with the temperatures of the waste heat, whereby it is possible to efficiently drive the Rankine cycle and obtain rotative power from waste heat from the cooling air coolers 54, and more effective use of waste heat becomes possible.

Here, the waste heat recovery boiler 253 may be the waste heat recovery boiler 153 in the second embodiment.

Fourth Embodiment

Figure 6:
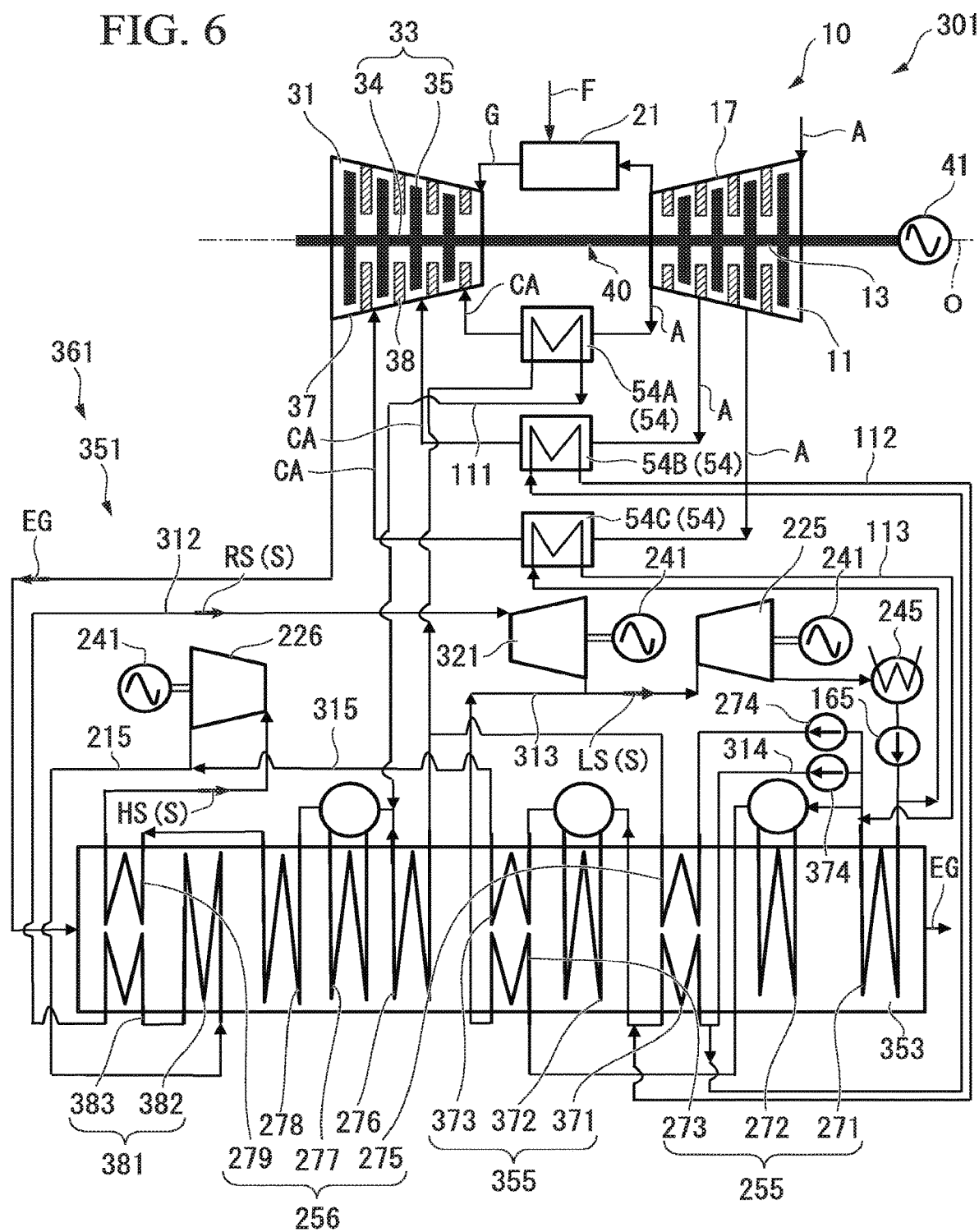
FIG. 6 is a system diagram of a gas turbine plant in a fourth embodiment of the present invention.

Next, a fourth embodiment of a gas turbine plant 301 according to the present invention will be described with reference to FIG. 6.

The gas turbine plant 301 of the present embodiment has the gas turbine plant 201 in the third embodiment as a basic constitution and is different from the third embodiment in terms of the constitution of a waste heat recovery boiler 353 in a waste heat recovery device 351 and the provision locations of the first recovery line 111, the second recovery line 112, and the third recovery line 113.

The waste heat recovery boiler 353 has, in addition to the high-pressure steam generating unit 256 and the low-pressure steam generating unit 255, an intermediate-pressure steam generating unit 355 that generates intermediate-pressure steam MS and a reheating unit 381 that re-superheats the steam S used to drive the high-pressure steam turbine 226.

In addition, as the steam turbines, three steam turbines of an intermediate-pressure steam turbine 321 in addition to the low-pressure steam turbine 225 and the high-pressure steam turbine 226 are provided. In the intermediate-pressure steam turbine 321, similarly, the generator 241 is provided.

The intermediate-pressure steam generating unit 355 has an intermediate-pressure water supply pump 374 that pressurizes water that has been heated using the low-pressure economizer 271, an intermediate-pressure economizer 371 that heats water that has been pressurized using the intermediate-pressure water supply pump 374, an intermediate-pressure evaporator 372 that turns water that has been heated using the intermediate-pressure economizer 371 into steam S, and an intermediate-pressure superheater 373 that superheats the steam S generated using the intermediate-pressure evaporator 372 and generates the intermediate-pressure steam MS.

The reheating unit 381 has a first reheater 382 that heats the steam S used to drive the high-pressure steam turbine 226 and a second reheater 383 that further superheats the steam S that has been superheated using the first reheater 382 and generates reheated steam RS.

The constituent elements of the reheating unit 381, the high-pressure steam generating unit 256, the intermediate-pressure steam generating unit 355, and the low-pressure steam generating unit 255 are arrange in an order of the second reheater 383, a second high-pressure superheater 279, the first reheater 382, the (first) high-pressure superheater 278, the high-pressure evaporator 277, the second high-pressure economizer 276, the intermediate-pressure superheater 373, the low-pressure superheater 273, the intermediate-pressure evaporator 372, the first high-pressure economizer 275, the intermediate-pressure economizer 371, the low-pressure evaporator 272, and the low-pressure economizer 271 from the turbine 31 toward the downstream side of the exhaust gas EG.

The low-pressure economizer 271 and the intermediate-pressure economizer 371 are connected to each other in an intermediate-pressure water supply line 314. In the intermediate-pressure water supply line 314, the above-described intermediate-pressure water supply pump 374 is provided.

The outlet of the high-pressure steam turbine 226 and the inlet of the first reheater 382 are connected to each other in a high-pressure steam recovery line 215 that sends the high-pressure steam HS from the high-pressure steam turbine 226 to the first reheater 382. The outlet of the second reheater 383 and the inlet of the intermediate-pressure steam turbine 321 are connected to each other in a reheated steam line 312 that sends the steam S that has been superheated using the second reheater 383 as reheated steam RS to the intermediate-pressure steam turbine 321. An intermediate-pressure steam recovery line 313 is connected to the outlet of the intermediate-pressure steam turbine 321. This intermediate-pressure steam recovery line 313 is joined to the low-pressure steam line 213. An intermediate-pressure steam line 315 is connected to the outlet of the intermediate-pressure superheater 373. This intermediate-pressure steam line 315 is joined to the high-pressure steam recovery line 215.

In addition, the first recovery line 111 is provided so that water is introduced from the inlet of the second high-pressure economizer 276 (the outlet of the first high-pressure economizer 275) into the first cooler 54A and then the water W from which waste heat from the first cooler 54A has been recovered is introduced into the outlet of the second high-pressure economizer 276 (the inlet of the high-pressure evaporator 277).

The second recovery line 112 is provided so that water is introduced from the inlet of the intermediate-pressure economizer 371 (on the downstream side of the intermediate-pressure water supply pump 374) into the second cooler 54B and then the water W from which waste heat from the second cooler 54B has been recovered is introduced into the outlet of the intermediate-pressure economizer 371 (the inlet of the intermediate-pressure evaporator 372).

The third recovery line 113 is provided so that water is introduced from the inlet of the low-pressure economizer 271 into the third cooler 54C and then the water W from which waste heat from the third cooler 54C has been recovered is introduced into the outlet of the low-pressure economizer 271 (which is the inlet of the low-pressure evaporator 272 and is on the upstream side of the high-pressure water supply pump 274 and the intermediate-pressure water supply pump 374).

As described above, waste heat from the first cooler 54A having a higher temperature among the cooling air coolers 54 is recovered to a portion in which the water W (or the steam S) has a higher pressure in the waste heat recovery boiler 353, and waste heat from the third cooler 54C having a lower temperature among the cooling air coolers 54 is recovered to a portion in which the water (or the steam S) has a lower pressure in the waste heat recovery boiler 353.

According to the gas turbine plant 301 of the present embodiment, the waste heat recovery device 351 has a so-called Rankine cycle including the waste heat recovery boiler 353, a steam turbine, and the like as constituent elements. Therefore, waste heat from the cooling air coolers 54 is recovered to individual locations having different temperatures in the Rankine cycle in accordance with the temperatures of the waste heat, whereby it is possible to efficiently drive the Rankine cycle. Therefore, it is possible to obtain rotative power from waste heat from the cooling air coolers 54, and more effective use of waste heat becomes possible.

The waste heat recovery boiler 353 may be the waste heat recovery boiler 153 or 253 in the second embodiment and the third embodiment.

Figure 7:
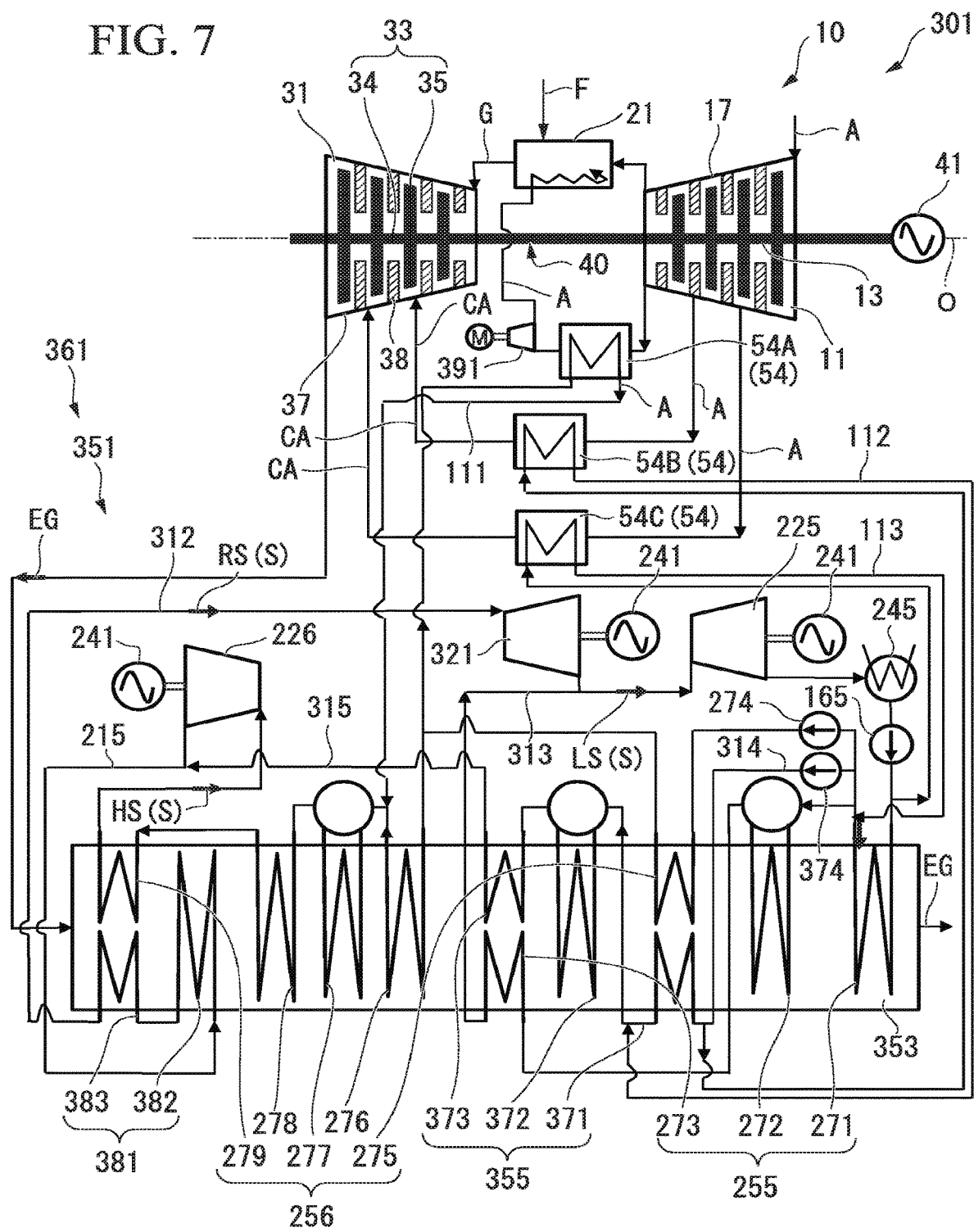
FIG. 7 is a system diagram of a gas turbine plant in a modification example of the fourth embodiment of the present invention.

In addition, as shown in FIG. 7, the gas turbine plant 301 may have an auxiliary compressor 391 that pressurizes the air A after the air A is bled from the compressor 11 and is introduced into the first cooler 54A.

The pressure of the cooling air CA that is generated in the first cooler 54A is increased using the above-described auxiliary compressor 391 is increased, whereby it is possible to improve the cooling effect on high-temperature components. Here, in FIG. 7, the cooling air CA from the first cooler 54A is used to cool the combustor 21, but cooling subjects are not particularly limited.

Fifth Embodiment

Figure 8:
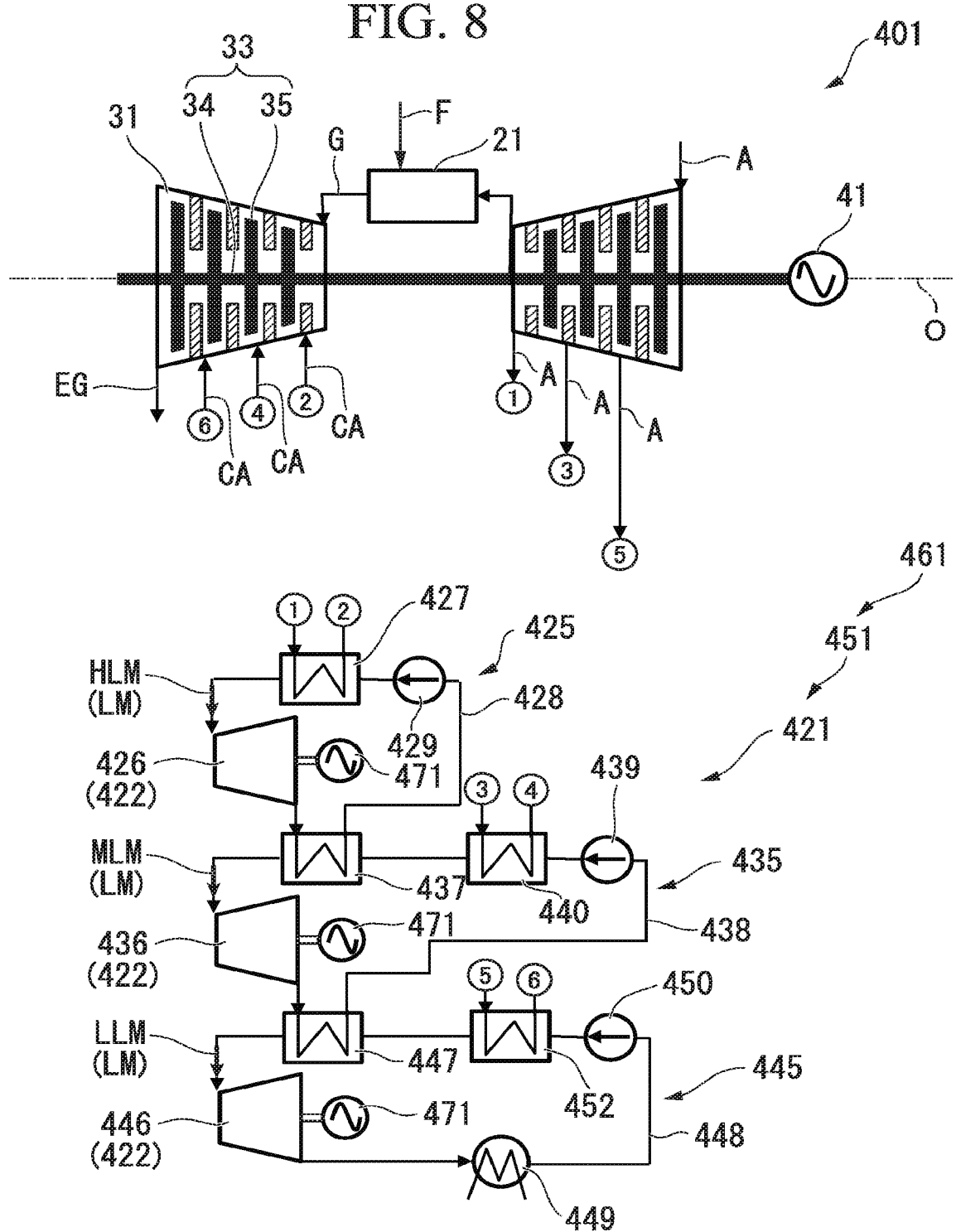
FIG. 8 is a system diagram of a gas turbine plant in a fifth embodiment of the present invention.

Next, a fifth embodiment of a gas turbine plant 401 according to the present invention will be described with reference to FIG. 8.

The gas turbine plant 401 of the present embodiment has the gas turbine plant 1 in the first embodiment as a basic constitution, and a waste heat recovery device 451 in a waste heat recovery system 461 further has a low-boiling-point medium Rankine cycle 421.

The low-boiling-point medium Rankine cycle 421 is a cycle that drives a turbine 422 using a medium having a lower boiling point than water (hereinafter, referred to as the low-boiling-point medium LM) that repeats the cycle consisting of condensation, evaporation and circulation.

Examples of the low-boiling-point medium LM include the following substances.
  Organic halogen compounds such as trichloroethylene, tetrachloroethylene, monochlorobenzene, dichlorobenzene, and perfluorodecaline
  Alkanes such as butane, propane, pentane, hexane, heptane, octane, and decane
  Cyclic alkanes such as cyclopentane and cyclohexane
  Thiophene, ketone, and aromatic compounds
  Refrigerants such as R134a and R245fa
  Combinations of the above-described substances.

In the present embodiment, as the low-boiling-point medium Rankine cycle 421, three systems having different boiling points are provided. In addition, a low-boiling-point medium LM having the highest boiling point (high-temperature low-boiling-point medium HLM) is used in a high-temperature low-boiling-point medium Rankine cycle 425, a low-boiling-point medium LLM having the lowest boiling point (low-temperature low-boiling-point medium) is used in a low-temperature low-boiling-point medium Rankine cycle 445, and a low-boiling-point medium having a boiling point between the highest boiling point and the lowest boiling point (intermediate-temperature low-boiling-point medium MLM) is used in an intermediate-temperature low-boiling-point medium Rankine cycle 435.

The high-temperature low-boiling-point medium Rankine cycle 425 has a high-temperature evaporator 427 that heats and evaporates the liquid-form high-temperature low-boiling-point medium HLM, a high-temperature turbine 426 that is driven using the evaporated high-temperature low-boiling-point medium HLM, a generator 471 that generates power by the driving of the high-temperature turbine 426, a high-temperature steam recovery line 428 that connects the outlet of the high-temperature turbine 426 and the high-temperature evaporator 427, and a high-temperature pump 429 provided in the high-temperature steam recovery line 428. The high-temperature evaporator 427 is provided on the high-temperature turbine 426 side of the high-temperature pump 429.

The intermediate-temperature low-boiling-point medium Rankine cycle 435 has an intermediate-temperature evaporator 437 that heats and evaporates the liquid-form intermediate-temperature low-boiling-point medium MLM, an intermediate-temperature turbine 436 that is driven using the evaporated intermediate-temperature low-boiling-point medium MLM, the generator 471 that generates power by the driving of the intermediate-temperature turbine 436, an intermediate-temperature steam recovery line 438 that connects the outlet of the intermediate-temperature turbine 436 and the intermediate-temperature evaporator 437, and an intermediate-temperature pump 439 provided in the intermediate-temperature steam recovery line 438.

Furthermore, the intermediate-temperature low-boiling-point medium Rankine cycle 435 has an intermediate-temperature heater 440 which is provided between the intermediate-temperature pump 439 and the intermediate-temperature evaporator 437 and heats the intermediate-temperature low-boiling-point medium MLM.

The intermediate-temperature evaporator 437 is provided closer to the inlet side of the intermediate-temperature turbine 436 than the intermediate-temperature pump 439 in the intermediate-temperature steam recovery line 438. Heat is exchanged between the high-temperature low-boiling-point medium HLM emitted from the high-temperature turbine 426 in the high-temperature low-boiling-point medium Rankine cycle 425 and the intermediate-temperature low-boiling-point medium MLM, whereby the intermediate-temperature low-boiling-point medium MLM is evaporated. That is, the intermediate-temperature evaporator 437 also functions as a high-temperature condenser that condenses the high-temperature low-boiling-point medium HLM.

The low-temperature low-boiling-point medium Rankine cycle 445 has a low-temperature evaporator 447 that heats and evaporates the liquid-form low-temperature low-boiling-point medium LLM, a low-temperature turbine 446 that is driven using the evaporated low-temperature low-boiling-point medium LLM, the generator 471 that generates power by the driving of the low-temperature turbine 446, a low-temperature steam recovery line 448 that connects the outlet of the low-temperature turbine 446 and the low-temperature evaporator 447, a low-temperature pump 450 provided in the low-temperature steam recovery line 448, and a low-temperature condenser 449 which is provided between the outlet of the low-temperature turbine 446 and the low-temperature pump 450 in the low-temperature steam recovery line 448 and cools and condenses the low-temperature low-boiling-point medium LLM used to drive the low-temperature turbine 446.

Furthermore, the low-temperature low-boiling-point medium Rankine cycle 445 has a low-temperature heater 452 which is provided between the low-temperature pump 450 and the low-temperature evaporator 447 and heats the intermediate-temperature low-boiling-point medium MLM.

The low-temperature evaporator 447 is provided closer to the inlet side of the low-temperature turbine 446 than the low-temperature pump 450 in the low-temperature steam recovery line 448. Heat is exchanged between the intermediate-temperature low-boiling-point medium MLM emitted from the intermediate-temperature turbine 436 in the intermediate-temperature low-boiling-point medium Rankine cycle 435 and the low-temperature low-boiling-point medium LLM, whereby the low-temperature low-boiling-point medium LLM is evaporated. That is, the low-temperature evaporator 447 also functions as an intermediate-temperature condenser that condenses the intermediate-temperature low-boiling-point medium MLM.

In addition, in the high-temperature evaporator 427, waste heat from the first cooler 54A is recovered through the first recovery line 111. In the intermediate-temperature heater 440, waste heat from the second cooler 54B is recovered through the second recovery line 112. In addition, the low-temperature heater 452, waste heat from the third cooler 54C is recovered through the third recovery line 113.

That is, in the present embodiment, waste heat from the cooling air coolers 54 having a higher temperature is recovered in the high-temperature low-boiling-point medium Rankine cycle 425, waste heat from the cooling air coolers 54 having a lower temperature is recovered in the low-temperature low-boiling-point medium Rankine cycle 445, and waste heat having an intermediate temperature is recovered in the intermediate-temperature low-boiling-point medium Rankine cycle 435.

According to the gas turbine plant 401 of the present embodiment, the waste heat recovery device 451 includes the low-boiling-point medium Rankine cycle 421 which is a so-called cascade low-boiling-point medium Rankine cycle having three heat source temperatures. In addition, waste heat from the cooling air coolers 54 are each recovered in the low-boiling-point medium Rankine cycle 421 that is driven using the low-boiling-point media LM having different boiling points in accordance with the temperatures of the waste heat. Therefore, it is possible to efficiently drive the low-boiling-point medium Rankine cycle 421 and obtain rotative power from waste heat from the cooling air coolers 54, and more effective use of waste heat becomes possible.

In the present embodiment, waste heat from the cooling air coolers 54 may be recovered in the low-boiling-point medium Rankine cycle 421 using the heating medium M.

Sixth Embodiment

Next, a sixth embodiment of a gas turbine plant 501 according to the present invention will be described with reference to FIG. 9.

The gas turbine plant 501 of the present embodiment has the gas turbine plant 201 in the third embodiment as a basic constitution and is different from the third embodiment in terms of a waste heat recovery device 551 in a waste heat recovery system 561.

The waste heat recovery device 551 has the water supply pump 165, a waste heat recovery boiler 553, the steam turbines 221 that are driven using steam S generated in the waste heat recovery boiler 553, the generators 241 that generate power by the driving of the steam turbines 221, a Rankine cycle 571 having the steam condenser 245 that returns the steam S used to drive the steam turbine 221 to water, and a low-boiling-point medium Rankine cycle 521 that is driven by recovering waste heat from the cooling air coolers 54.

The waste heat recovery boiler 553 has the low-pressure steam generating unit 255 that generates low-pressure steam LS and the high-pressure steam generating unit 256 that generates high-pressure steam HS. In addition, in the present embodiment, unlike the third embodiment, only one high-pressure economizer is provided in the high-pressure steam generating unit 256. This high-pressure economizer corresponds to the second high-pressure economizer 276 in the third embodiment. Therefore, the constituent elements of the high-pressure steam generating unit 256 and the low-pressure steam generating unit 255 are arrange in an order of the high-pressure superheater 278, the high-pressure evaporator 277, the high-pressure economizer 276, the low-pressure superheater 273, the low-pressure evaporator 272, and the low-pressure economizer 271 from the turbine 31 toward the downstream side of the exhaust gas EG.

In addition, the first recovery line 111 is provided in the waste heat recovery device 551 so that water is introduced from the outlet of the low-pressure economizer 271 (the inlet of the low-pressure evaporator 272) into the first cooler 54A and then the water W from which waste heat from the first cooler 54A has been recovered is introduced into the outlet of the high-pressure economizer 276 (the inlet of the high-pressure evaporator 277).

In addition, the second recovery line 112 is provided in the waste heat recovery device 551 so as to be branched from the first recovery line 111 on the downstream side of the high-pressure water supply pump 274 so that water is introduced from the outlet of the low-pressure economizer 271 (the inlet of the low-pressure evaporator 272) into the second cooler 54B and then the water W from which waste heat from the second cooler 54B has been recovered is introduced into the low-boiling-point medium Rankine cycle 521.

In addition, the third recovery line 113 is provided in the waste heat recovery device 551 so as to be branched from the first recovery line 111 so that the water W is introduced from the outlet of the low-pressure economizer 271 (the inlet of the low-pressure evaporator 272) into the third cooler 54C and then the water W from which waste heat from the third cooler 54C has been recovered is introduced into the low-boiling-point medium Rankine cycle 521.

In the present embodiment, regarding the second recovery line 112 and the third recovery line 113, the water W is caused to flow toward the second cooler 54B and the third cooler 54C through a common line from the outlet of the low-pressure economizer 271 (the inlet of the low-pressure evaporator 272), and then the water W is introduced into the second cooler 54B and the third cooler 54C by branching the line toward the second cooler 54B and the third cooler 54C.

The low-boiling-point medium Rankine cycle 521 is, similar to the fifth embodiment, a cycle that drives a turbine 573 using the low-boiling-point medium LM that repeats the cycle consisting of condensation, evaporation, and circulation.

The low-temperature low-boiling-point medium Rankine cycle 521 has a heater 575 that heats the liquid-form low-boiling-point medium LM, an evaporator 576 that evaporates water from the heater 575, the turbine 573 that is driven using the evaporated low-boiling-point medium LM, a generator 574 that generates power by the driving of the turbine 573, a condenser 578 that condenses the steam S used to drive the high-pressure steam turbine 226, a reheater 577 that heats the low-boiling-point medium LM that is introduced from the condenser 578 using the heat of the low-boiling-point medium LM used to drive the turbine 573 and sends the low-boiling-point medium to the evaporator 576, and a pump 579 that circulates the low-boiling-point medium LM.

The second recovery line 112 is connected to the evaporator 576, and waste heat from the second cooler 54B is delivered to the low-boiling-point medium LM in the evaporator 576. In addition, the third recovery line 113 is connected to the heater 575, and waste heat from the third cooler 54C is delivered to the low-boiling-point medium LM in the heater 575. After the delivery of waste heat, the water W introduced through the second recovery line 112 and the third recovery line 113 is introduced into the inlet of the low-pressure economizer 271 in the waste heat recovery boiler 553 in the Rankine cycle 571 through a returning line.

That is, in the present embodiment, among waste heat from the cooling air coolers 54, waste heat having a higher temperature (waste heat from the first cooler 54A) is recovered in the Rankine cycle 571, and, among waste heat from the cooling air coolers 54, waste heat having a lower temperature (waste heat from the second cooler 54B and the third cooler 54C) is recovered in the low-boiling-point medium Rankine cycle 521.

Furthermore, waste heat from the second cooler 54B which is waste heat having a higher temperature among waste heat from the second cooler 54B and the third cooler 54C is recovered to a location having a higher temperature in the low-boiling-point medium Rankine cycle 521.

According to the gas turbine plant 501 of the present embodiment, the waste heat recovery device 551 includes the low-boiling-point medium Rankine cycle 521 and the Rankine cycle 571 that is driven using the water W. In addition, waste heat from the cooling air coolers 54 is recovered in the Rankine cycle 571 or the low-boiling-point medium Rankine cycle 521 depending on the temperature of waste heat, and the Rankine cycle or the low-boiling-point medium Rankine cycle is driven. Therefore, it is possible to efficiently drive the low-boiling-point medium Rankine cycle 521 and the Rankine cycle 571 and obtain rotative power from waste heat from the cooling air coolers 54, and more effective use of waste heat becomes possible.

The waste heat recovery boiler 553 may be the waste heat recovery boiler 153, 253, or 353 in the second to fourth embodiments.

Seventh Embodiment

Figure 10:
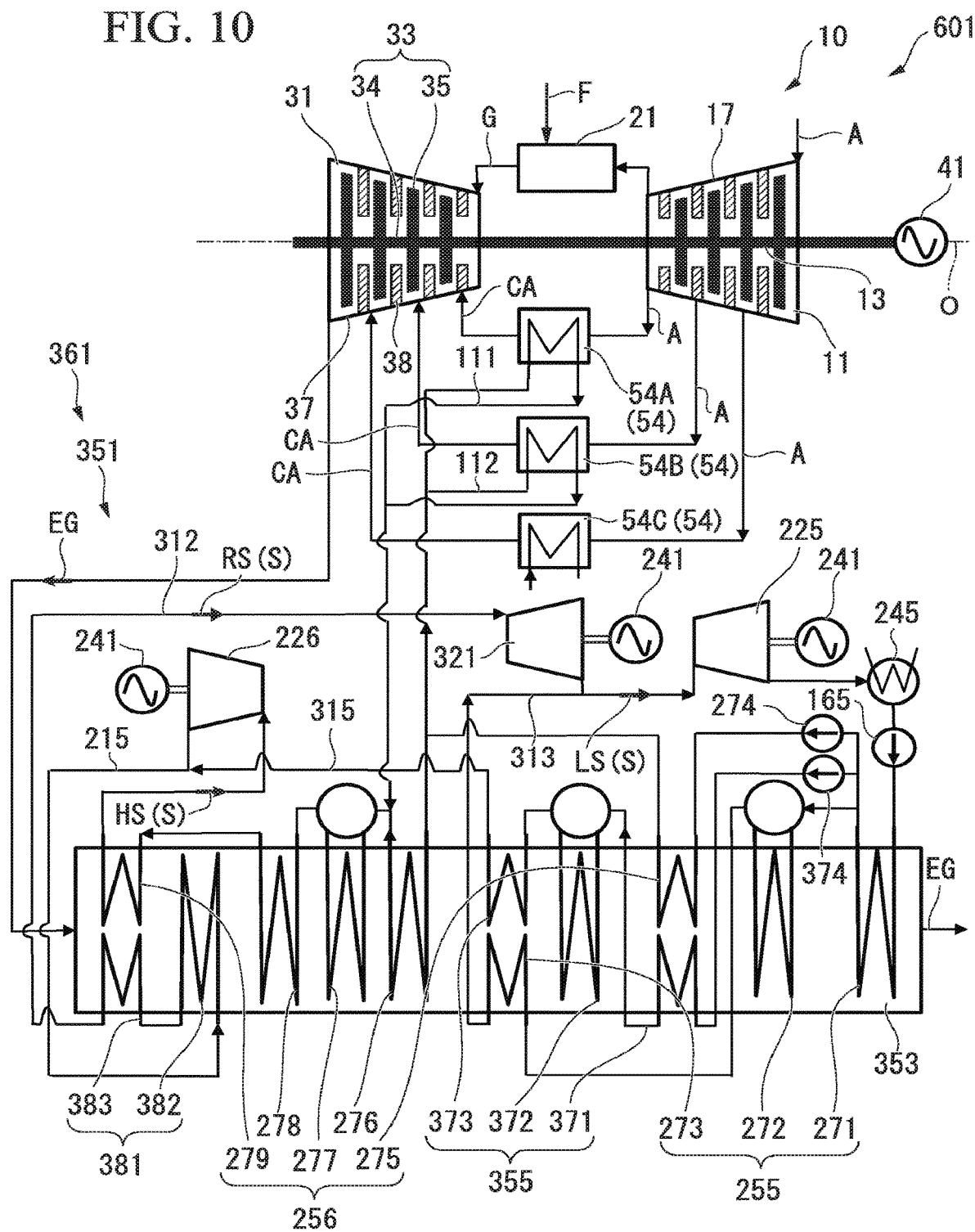
FIG. 10 is a system diagram of a gas turbine plant in a seventh embodiment of the present invention.

Next, a seventh embodiment of a gas turbine plant 601 according to the present invention will be described with reference to FIG. 10.

The gas turbine plant 601 of the present embodiment has the gas turbine plant 301 in the fourth embodiment as a basic constitution and is different from the fourth embodiment in terms of the recovery location of waste heat from the cooling air coolers 54.

Similar to the fourth embodiment, the first recovery line 111 is provided so that the water W is introduced from the outlet of the first high-pressure economizer 275 (the inlet of the second high-pressure economizer 276) into the first cooler 54A and then water from which waste heat from the first cooler 54A has been recovered is introduced into the outlet of the second high-pressure economizer 276 (the inlet of the high-pressure evaporator 277).

The second recovery line 112 is provided so as to be branched from the first recovery line 111 on the upstream side of the first cooler 54A so that water from the first recovery line 111 is introduced into the second cooler 54B and then the water W from which waste heat from the second cooler 54B has been recovered is introduced into the first recovery line 111 on the downstream side of the first cooler 54A. That is, waste heat from the first cooler 54A and the second cooler 54B is recovered by causing the water W which is a heating medium M to flow in parallel, and this waste heat is recovered in the waste heat recovery boiler 353 in a form of mixed waste heat.

In addition, in the present embodiment, waste heat from the third cooler 54C is discharged to the outside of the gas turbine plant 601. Since the temperature of waste heat from the third cooler 54C is low, the value of using the waste heat is small, and, in a case in which it is inappropriate to recover waste heat from the third cooler 54C by providing pipes and the like in terms of costs, it is possible to simplify the structure of the waste heat recovery system 261 using the above-described embodiment and improve economic efficiency.

According to the gas turbine plant 601 of the present embodiment, in a case in which the temperature difference between waste heat from the first cooler 54A and the second cooler 54B is small, it is possible to simplify the structure of the waste heat recovery system 261 while maintaining the recovery efficiency of waste heat by mixing the waste heat together.

Here, in a case in which the temperature difference between waste heat from the third cooler 54C and waste heat from the first cooler 54A and the second cooler 54B is small, waste heat may be recovered by causing the water W to flow in parallel with the first cooler 54A and the second cooler 54B without discharging waste heat from the third cooler 54C to the outside of the gas turbine plant 601.

Eighth Embodiment

Figure 11:
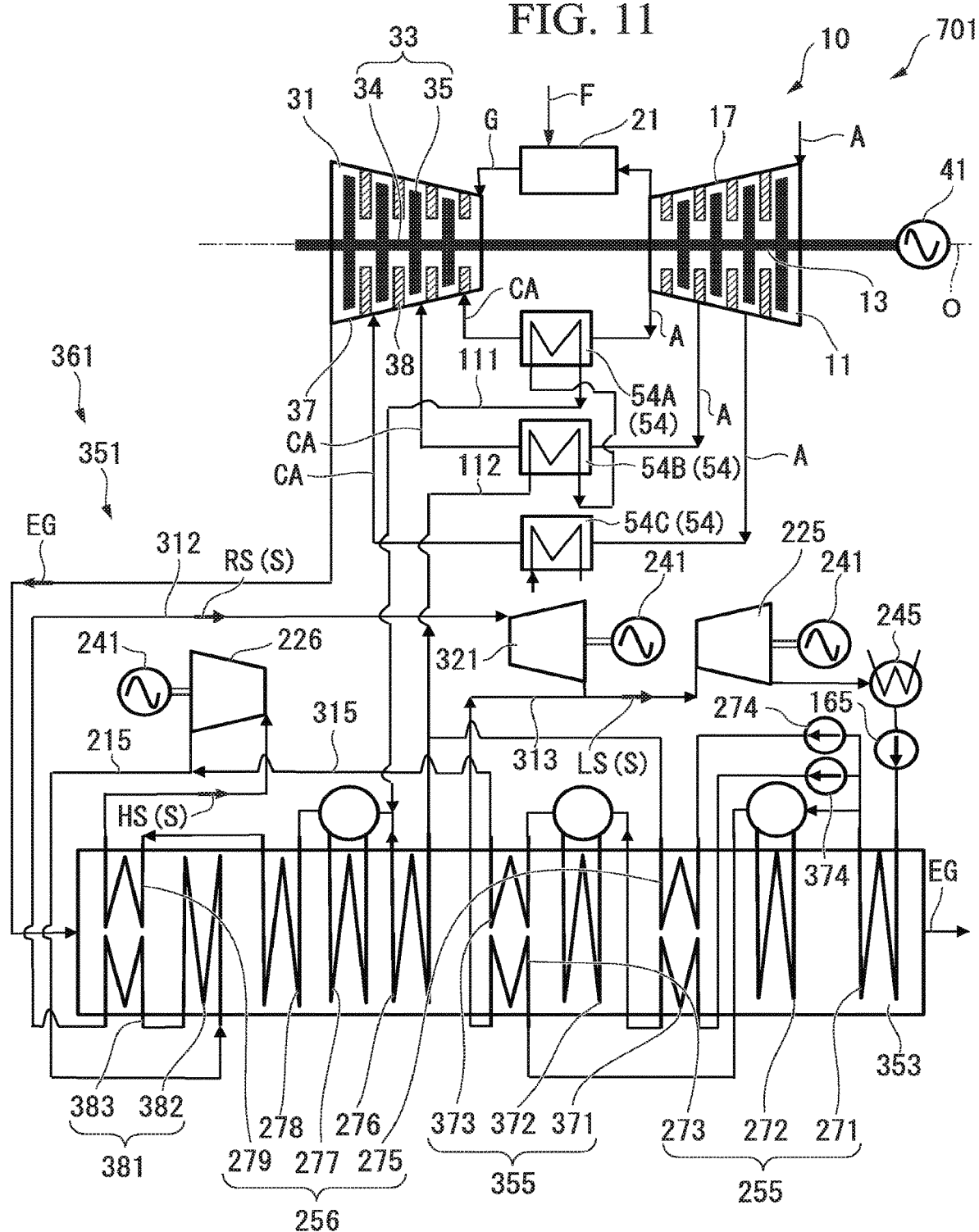
FIG. 11 is a system diagram of a gas turbine plant in an eighth embodiment of the present invention.

Next, an eighth embodiment of a gas turbine plant 701 according to the present invention will be described with reference to FIG. 11.

The gas turbine plant 701 of the present embodiment has the gas turbine plant 301 in the fourth embodiment as a basic constitution and is different from the fourth embodiment in terms of the recovery location of waste heat from the cooling air coolers 54.

The second recovery line 112 is provided so that the water W is introduced from the outlet of the first high-pressure economizer 275 (the inlet of the second high-pressure economizer 276) to the second cooler 54B.

The second recovery line is connected to the downstream side of the second cooler 54B, that is, the outlet side of the first cooler 54A. The first recovery line 111 is provided so that waste heat from the first cooler 54A is further recovered to the water W in which waste heat from the second cooler 54B has been recovered and the water W is introduced into the outlet of the second high-pressure economizer 276 (the inlet of the high-pressure evaporator 277).

That is, waste heat is recovered by causing the water W which is a heating medium M to flow in series toward the first cooler 54A (high-temperature side cooling air cooler) capable of recovering waste heat having a higher temperature from the second cooler 54B (low-temperature side cooling air cooler) capable of recovering waste heat having a lower temperature. That is, this waste heat is recovered in the waste heat recovery boiler 353 in a formed of mixed waste heat.

In addition, in the present embodiment, waste heat from the third cooler 54C is discharged to the outside of the gas turbine plant 701. Since the temperature of waste heat from the third cooler 54C is low, the value of using the waste heat is small, and, in a case in which it is inappropriate to recover waste heat from the third cooler 54C by providing pipes and the like in terms of costs, it is possible to simplify the structure of the waste heat recovery system using the above-described embodiment and improve economic efficiency.

According to the gas turbine plant 701 of the present embodiment, it is possible to improve the recovery efficiency of waste heat by sequentially recovering waste heat in an incremental order of temperature of the waste heat.

In a case in which the temperature difference between waste heat from the first cooler 54A and the second cooler 54B and waste heat from the third cooler 54C is great, waste heat may be recovered by causing the water W to flow in parallel with the first cooler 54A, the second cooler 54B, and the third cooler 54C without discharging waste heat from the third cooler 54C to the outside of the gas turbine plant 701.

Ninth Embodiment

Next, a ninth embodiment of a gas turbine plant 801 according to the present invention will be described with reference to FIG. 12.

The gas turbine plant 801 of the present embodiment has the gas turbine plant 301 in the fourth embodiment as a basic constitution and is different from the fourth embodiment in terms of the recovery location of waste heat from the cooling air coolers 54.

The second recovery line 112 is provided so that the water W is introduced from the outlet of the first high-pressure economizer 275 (the inlet of the second high-pressure economizer 276) to the second cooler 54B.

The third recovery line 113 is provided so as to be branched from the second recovery line 112 on the upstream side of the second cooler 54B so that the water W from the second recovery line 112 is introduced into the third cooler 54C and then the water W from which waste heat from the third cooler 54C has been recovered is introduced into the second recovery line 112 on the downstream side of the second cooler 54B in terms of the flow of the water W.

That is, waste heat from the second cooler 54B and the third cooler 54C is recovered by causing the water W which serves as a heating medium M to flow in parallel. That is, waste heat from the second cooler 54B and the third cooler 54C is recovered in the waste heat recovery boiler 353 in a form of mixed waste heat. As described above, the second cooler 54B and the third cooler 54C constitute a parallel cooling air cooler group.

In addition, the first recovery line 111 is connected to the second recovery line 112 on the downstream side of the above-described parallel cooling air cooler group, that is, the outlet side of the second cooler 54B and the third cooler 54C. The first recovery line 111 is provided so that the water W in which waste heat from the second cooler 54B and the third cooler 54C is recovered and then waste heat from the first cooler 54A is further recovered is introduced into the outlet of the second high-pressure economizer 276 (the inlet of the high-pressure evaporator 277).

That is, in the waste heat recovery device 351, the water W which serves as a heating medium M is caused to flow in series toward the first cooler 54A from the parallel cooling air cooler group so that waste heat is recovered in parallel in the parallel cooling air cooler group which is waste heat having a higher temperature and then waste heat from the first cooler 54A is recovered. In addition, this waste heat are recovered in the waste heat recovery boiler 353 in a formed of mixed waste heat.

According to the gas turbine plant 801 of the present embodiment, it is possible to improve the recovery efficiency of waste heat by sequentially recovering waste heat having a low temperature (mixed waste heat in the parallel cooling air cooler group) first and then waste heat having a high temperature (waste heat from the first cooler 54A). Particularly, in a case in which waste heat from each of the cooling air coolers 54 which have a large temperature difference and a small temperature difference are present together, it is preferable to jointly recover waste heat in parallel and in series as in the present embodiment from the viewpoint of efficient waste heat recovery.

Tenth Embodiment

Figure 13:
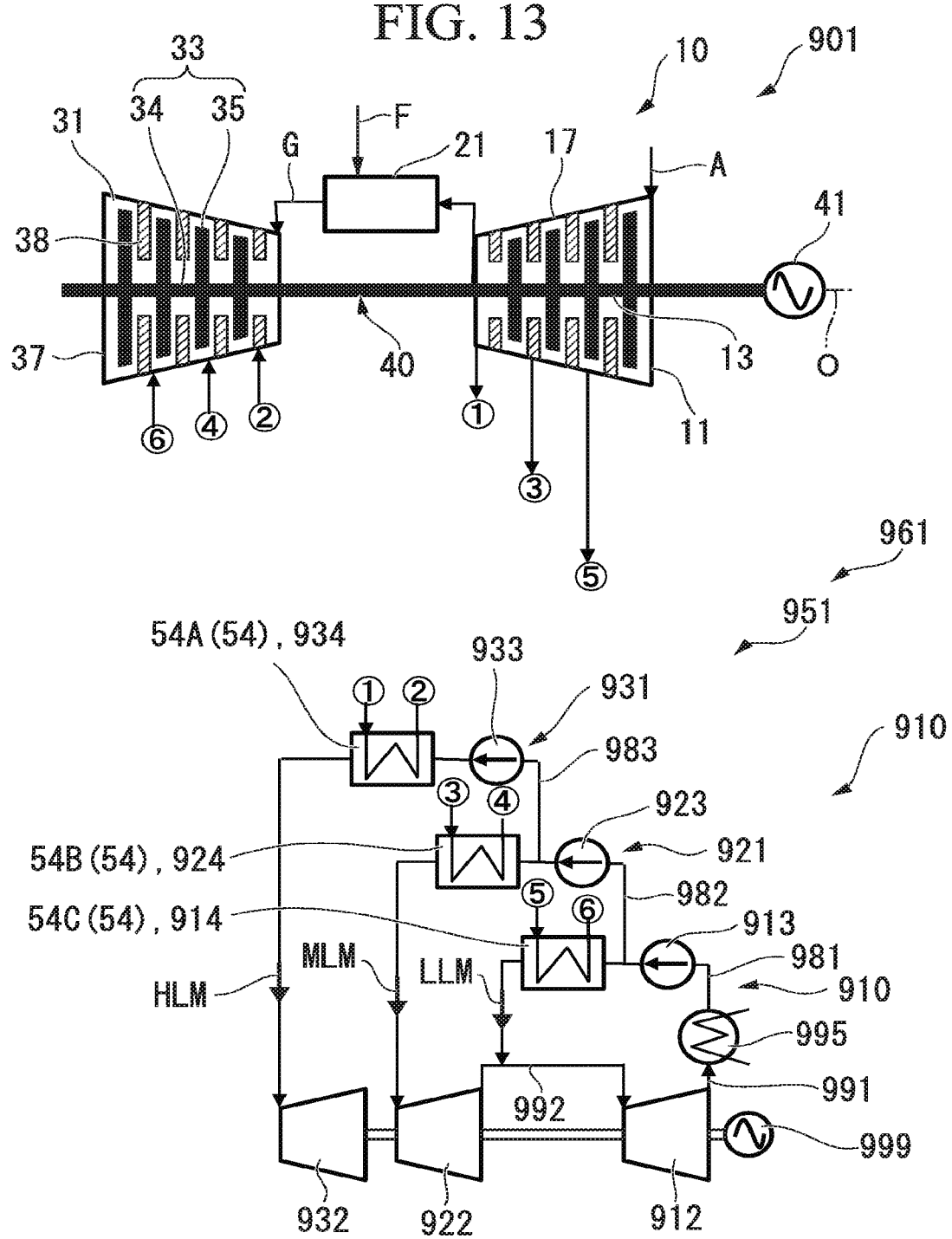
FIG. 13 is a system diagram of a gas turbine plant in a tenth embodiment of the present invention.

Next, a tenth embodiment of a gas turbine plant 901 according to the present invention will be described with reference to FIG. 13.

The gas turbine plant 901 of the present embodiment has the gas turbine plant 401 in the fifth embodiment as a basic constitution and is different from the fifth embodiment in terms of the low-boiling-point medium Rankine cycle. That is, a waste heat recovery device 951 in a waste heat recovery system 961 has a low-boiling-point medium Rankine cycle 910.

The low-boiling-point medium Rankine cycle 910 has a high-pressure portion 931, an intermediate-pressure portion 921, a low-pressure portion 911, a condenser 995 that stores a low-boiling-point medium LM which will be supplied to the above-described portions, and a generator 999 that generates power by the driving of the high-pressure portion 931, the intermediate-pressure portion 921, and the low-pressure portion 911.

The low-pressure portion 911 has a low-pressure evaporator 914 that heats and evaporates the liquid-form low-boiling-point medium LM from the condenser 995 and generates a gas-form low-pressure low-boiling-point medium LLM, a low-pressure supply line 981 and a low-pressure pump 913 that supply the liquid-form low-pressure low-boiling-point medium LLM from the condenser 995 to the low-pressure evaporator 914, and a low-pressure turbine 912 that is driven using the low-pressure low-boiling-point medium LLM. The low-pressure low-boiling-point medium LLM emitted from the low-pressure turbine 912 is sent to the condenser 995 through a low-pressure recovery line 991.

The intermediate-pressure portion 921 has an intermediate-pressure evaporator 924 that heats and evaporates the liquid-form low-boiling-point medium LM from the condenser 995 and generates a gas-form intermediate-pressure low-boiling-point medium MLM, an intermediate-pressure pump 923 that supplies the liquid-form low-boiling-point medium LM from the condenser 995 to the intermediate-pressure evaporator 924, and an intermediate-pressure turbine 922 that is driven using the intermediate-pressure low-boiling-point medium MLM.

The low-boiling-point medium LM from the condenser 995 is supplied to the intermediate-pressure evaporator 924 using the intermediate-pressure supply line 982 and the intermediate-pressure pump 923 which are connected so as to be branched from the low-pressure supply line 981 between the low-pressure pump 913 and the low-pressure evaporator 914. In addition, the intermediate-pressure low-boiling-point medium MLM emitted from the intermediate-pressure turbine 922 is sent to the inlet of the low-pressure turbine 912 through the intermediate-pressure recovery line 992 together with the low-pressure low-boiling-point medium LLM.

The high-pressure portion 931 has a high-pressure evaporator 934 that heats and evaporates the liquid-form low-boiling-point medium LM from the condenser 995 and generates a gas-form high-pressure low-boiling-point medium HLM, a high-pressure pump 933 that supplies the liquid-form low-boiling-point medium LM from the condenser 995 to the high-pressure evaporator 934, and a high-pressure turbine 932 that is driven using the high-pressure low-boiling-point medium HLM.

The low-boiling-point medium LM from the condenser 995 is supplied to the high-pressure evaporator 934 using the high-pressure supply line 983 and the high-pressure pump 933 which are connected so as to be branched from the intermediate-pressure supply line 982 between the intermediate-pressure pump 923 and the intermediate-pressure evaporator 924.

As described below, the low-boiling-point medium Rankine cycle 910 serves as a so-called three-pressure low-boiling-point medium Rankine cycle.

In addition, waste heat from the first cooler 54A is introduced into the high-pressure evaporator 934, waste heat from the second cooler 54B is introduced into the intermediate-pressure evaporator 924, and waste heat from the third cooler 54C is introduced into the low-pressure evaporator 914. That is, waste heat from the cooling air cooler 54 in a place having a higher pressure is recovered as high-temperature waste heat to a location in which the low-boiling-point medium LM has a higher temperature (or pressure), and waste heat from the cooling air cooler 54 in a place having a lower pressure is recovered as low-temperature waste heat to a location in which the low-boiling-point medium LM has a lower temperature (or pressure).

In the present embodiment, the first cooler 54A and the high-pressure evaporator 934, the second cooler 54B and the intermediate-pressure evaporator 924, and the third cooler 54C and the low-pressure evaporator 914 have the same function. That is, these components recover waste heat using the low-boiling-point medium LM as a heating medium.

According to the gas turbine plant 901 of the present embodiment, it is possible to drive the low-boiling-point medium Rankine cycle 910 by carrying out heat exchange between waste heat and the low-boiling-point medium LM at locations having temperatures corresponding to the temperatures of individual waste heats in accordance with the temperatures of the waste heat from the cooling air coolers 54. Therefore, more effective use of waste heat becomes possible.

Eleventh Embodiment

Figure 14:
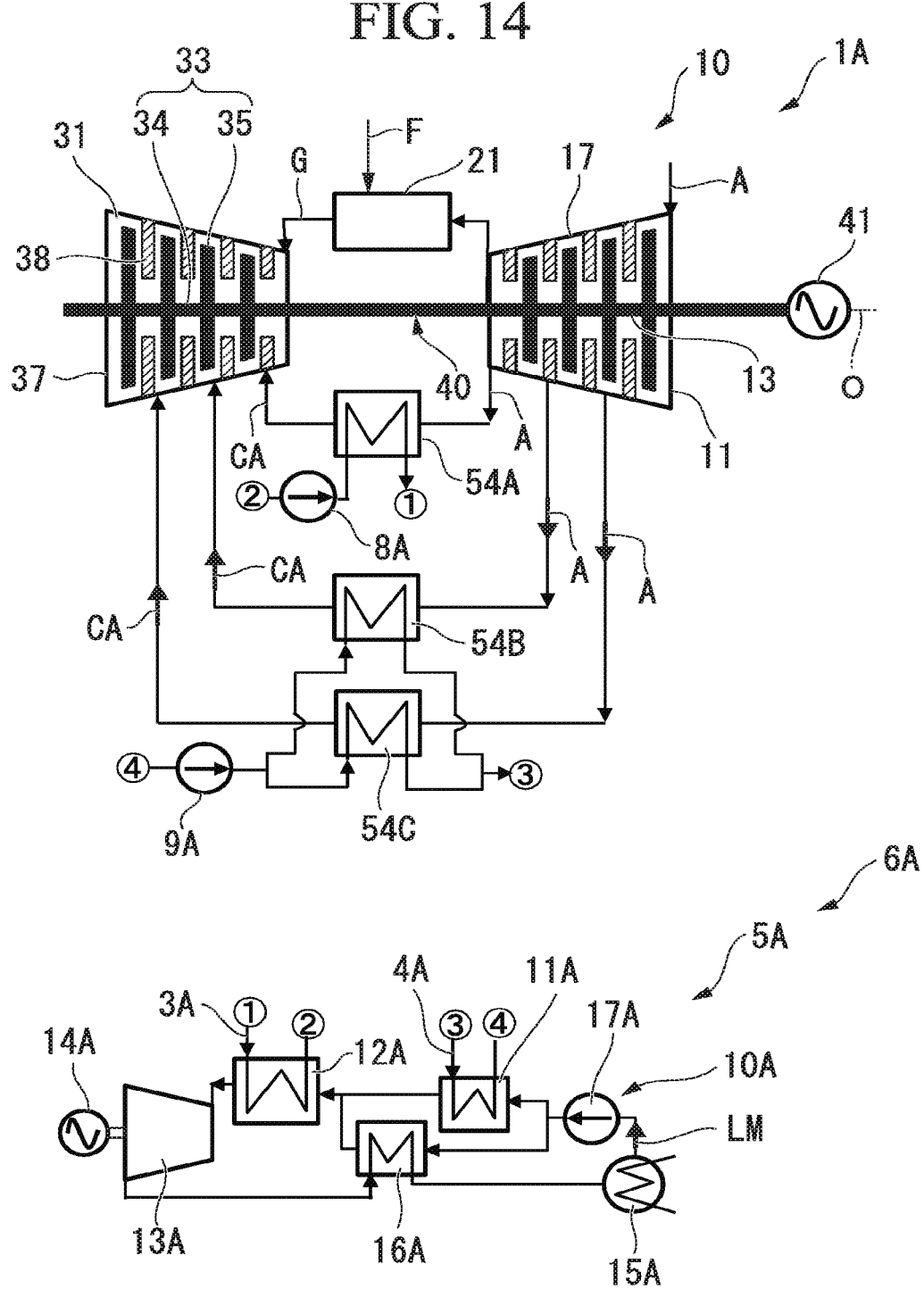
FIG. 14 is a system diagram of a gas turbine plant in an eleventh embodiment of the present invention.

Next, an eleventh embodiment of a gas turbine plant 1A according to the present invention will be described with reference to FIG. 14.

The gas turbine plant 1A of the present embodiment has the gas turbine plant 401 in the fifth embodiment as a basic constitution and is different from the fifth embodiment in terms of the low-boiling-point medium Rankine cycle. That is, a waste heat recovery device 5A in a waste heat recovery system 6A has a low-boiling-point medium Rankine cycle 10A.

The low-boiling-point medium Rankine cycle 10A has a first heater 11A that heats a liquid-form low-boiling-point medium LM, a second heater 12A that further heats and evaporate the low-boiling-point medium LM from the first heater 11A, a turbine 13A that is driven using the evaporated low-boiling-point medium LM, a generator 14A that generates power by the driving of the turbine 13A, a condenser 15A that condenses the low-boiling-point medium LM used to drive the turbine 13A, a reheater 16A that heats the low-boiling-point medium LM that is introduced from the condenser 15A using the heat of the low-boiling-point medium LM used to drive the turbine 13A and sends the low-boiling-point medium LM to the second heater 12A, and a pump 17A that circulates the low-boiling-point medium LM.

In addition, a first recovery line 3A is provided so that waste heat from the first cooler 54A is introduced into the second heater 12A. In addition, a second recovery line 4A is provided so that waste heat from the second cooler 54B and the third cooler 54C is introduced into the first heater 11A.

A first pump 8A is provided in the first recovery line 3A, and a heating medium M is circulated between the first cooler 54A and the second heater 12A using the first pump 8A.

A second pump 9A is provided in the second recovery line 4A, and the heating medium M is circulated between the second cooler 54B and the third cooler 54C and the first heater 11A using the second pump 9A.

The second recovery line 4A causes the heating medium M to flow into the second cooler 54B and the third cooler 54C in parallel and then causes the heating medium M to flow out.

As described above, in the present embodiment, waste heat from a plurality of cooling air coolers 54 are individually recovered to locations of two places in which the temperatures of the low-boiling-point medium LM in the low-boiling-point medium Rankine cycle 10A are different from each other, that is, in the first heater 11A and the second heater 12A using the heating medium M.

Furthermore, waste heat from the respective cooling air coolers 54, waste heat from two places (waste heat from the second cooler 54B and the third cooler 54C), is recovered to the same location in which the low-boiling-point medium LM in the low-boiling-point medium Rankine cycle 10A has the same temperature using the same system of heating medium M.

That is, waste heat from the cooling air cooler 54 in a place having a higher pressure is recovered as high-temperature waste heat to a location in which the low-boiling-point medium LM has a higher temperature (or pressure), and waste heat from the cooling air cooler 54 in a place having a lower pressure is recovered as low-temperature waste heat to a location in which the low-boiling-point medium LM has a lower temperature (or pressure).

According to the gas turbine plant 1A of the present embodiment, it is possible to drive the low-boiling-point medium Rankine cycle 10A by carrying out heat exchange between waste heat and the low-boiling-point medium LM at locations having temperatures corresponding to the temperatures of individual waste heats in accordance with the temperatures of the waste heat from the cooling air coolers 54. Therefore, more effective use of waste heat becomes possible.

In addition, waste heat from two places are recovered in parallel using the same system of heating medium M, whereby, in a case in which the temperature difference between waste heat recovered using the cooling air coolers 54 is small, it is possible to simplify the structure of the waste heat recovery system 6A while maintaining the recovery efficiency of waste heat by mixing the waste heat together.

Meanwhile, in the present embodiment, waste heat from the second cooler 54B and the third cooler 54C are recovered in parallel using the same system of heating medium M, the recovery method of waste heat is not limited thereto. For example, in a case in which waste heat from the second cooler 54B has a higher temperature than waste heat from the third cooler 54C, waste heat may be recovered by causing the heating medium M in series from the second cooler 54B to the third cooler 54C. In addition, waste heat may be jointly recovered in series and in parallel from all of the cooling air coolers 54.

Figure 15:
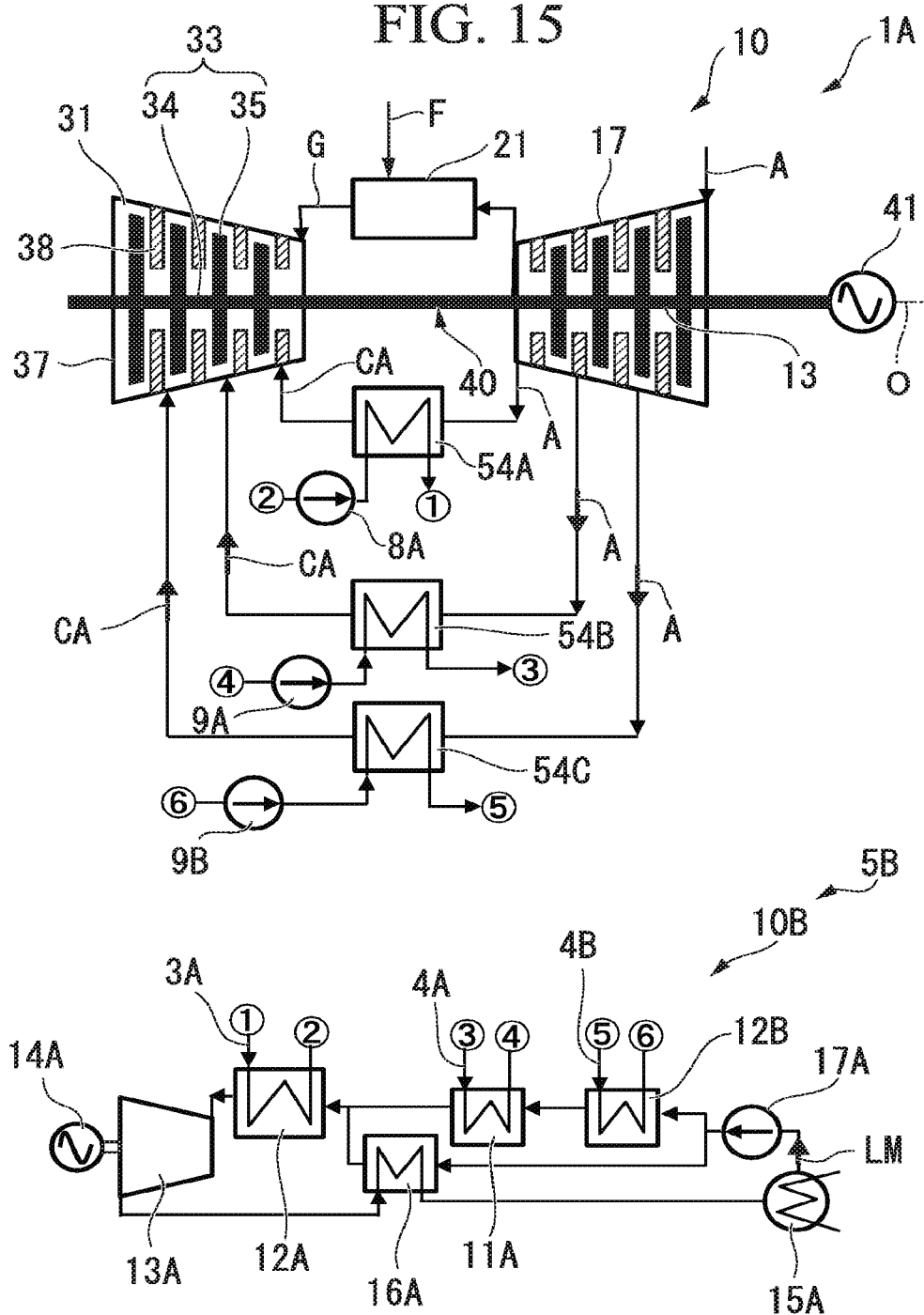
FIG. 15 is a system diagram of a gas turbine plant in a modification example of the eleventh embodiment of the present invention.

In addition, as shown in FIG. 15, the low-boiling-point medium Rankine cycle 10B may be a preheat low-boiling-point medium Rankine cycle having three heat sources.

Specifically, the low-boiling-point medium Rankine cycle 10B has the first heater 11A that heats a liquid-form low-boiling-point medium LM, the second heater 12A that further heats the low-boiling-point medium LM from the first heater 11A, the third heater 12B that further heats the low-boiling-point medium LM from the second heater 12A, the turbine 13A that is driven using the evaporated low-boiling-point medium LM, the generator 14A that generates power by the driving of the turbine 13A, the condenser 15A that condenses the low-boiling-point medium LM used to drive the turbine 13A, the reheater 16A that heats the low-boiling-point medium LM that is introduced from the condenser 15A using the heat of the low-boiling-point medium LM used to drive the turbine 13A and sends the low-boiling-point medium to a third heater 12B.

In addition, in the waste heat recovery device 5A, the first recovery line 3A and the first pump 8A are provided so that waste heat from the first cooler 54A is introduced into the second heater 12A using the heating medium M.

In addition, the second recovery line 4A and the second pump 9A are provided so that waste heat from the second cooler 54B is introduced into the second heater 12A using different systems of heating media M from that in the first cooler 54A.

In addition, the third recovery line 4B and the third pump 9B are provided so that waste heat from the third cooler 54C is introduced into the first heater 11A using different systems of heating media M from those in the first cooler 54A and the second cooler 54B.

As described above, in the present embodiment, waste heat from the each of the cooling air coolers 54 may be individually recovered to portions in which the low-boiling-point medium LM has different temperatures (or pressures) in the low-boiling-point medium Rankine cycle 10B.

Twelfth Embodiment

Figure 16:
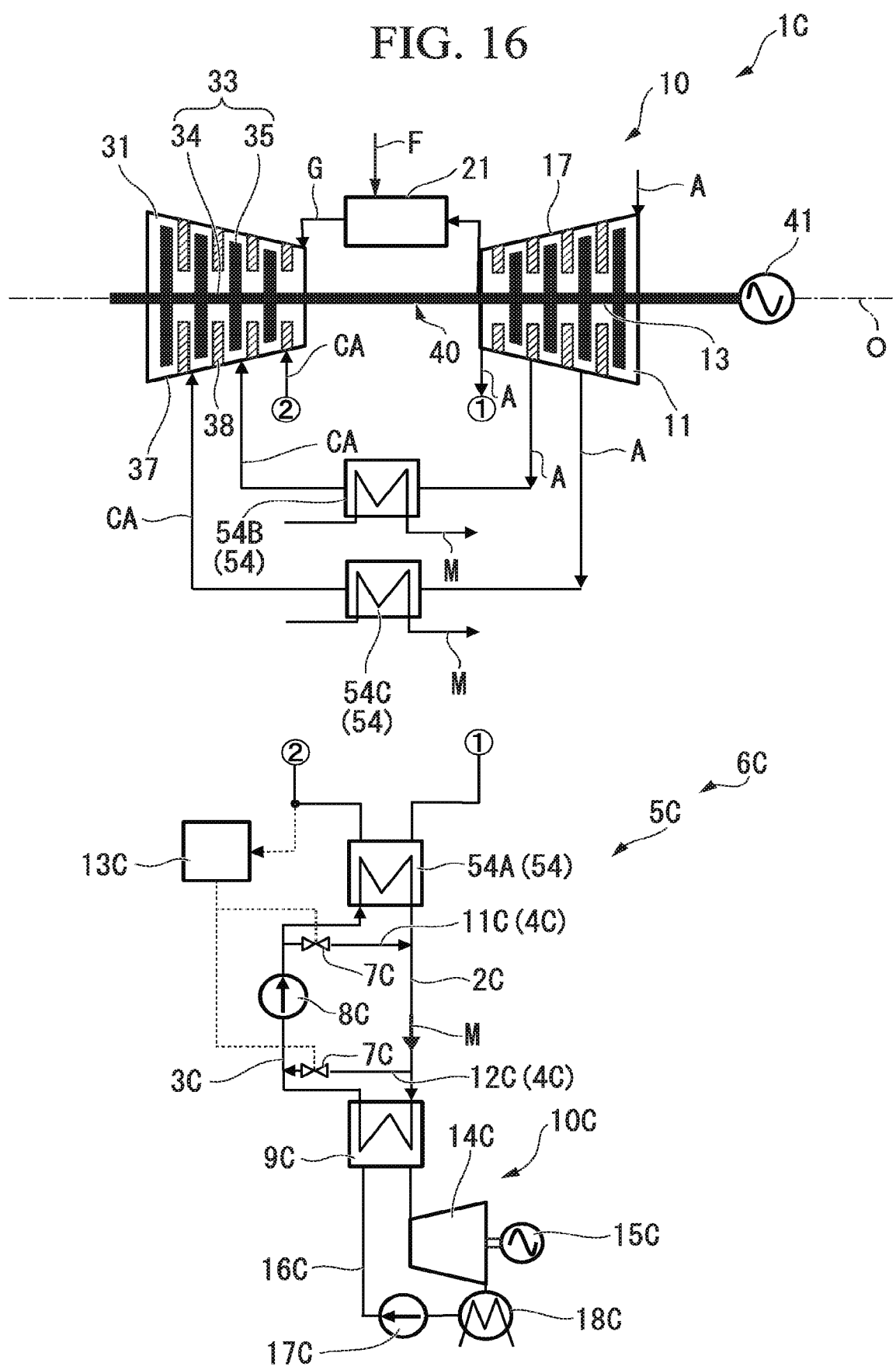
FIG. 16 is a system diagram of a gas turbine plant in a twelfth embodiment of the present invention.

Next, a twelfth embodiment of a gas turbine plant 1C according to the present invention will be described with reference to FIG. 16.

The gas turbine plant 1C of the present embodiment has the gas turbine plant 1 in the first embodiment as a basic constitution and is different from the first embodiment in terms of a waste heat recovery device 5C in a waste heat recovery system 6C.

That is, the waste heat recovery device 5C has the cooling air coolers 54, an evaporator 9C that is separately provided from the cooling air coolers 54, a recovery line 2C and a returning line 3C which connect the first cooler 54A among the cooling air coolers 54 and a evaporator 9C, a pump 8C that circulates a heating medium M between the first cooler 54A and the evaporator 9C through the recovery line 2C and the returning line 3C, and a low-boiling-point medium Rankine cycle 10C in which the low-boiling-point medium LM repeats a cycle consisting of condensation, evaporation in the evaporator 9C, and circulation.

Furthermore, the waste heat recovery device 5C has bypass lines 4C which allow the recovery line 2C and the returning line 3C to communicate without the cooling air coolers 54 and the evaporator 9C being therebetween and thus enables the heating media M to flow therebetween, flow rate-adjusting valves 7C that adjust the flow rates of the heating media M which flow through the bypass lines 4C, and a control device 13C that adjusts the flow rate-adjusting valves 7C.

The recovery line 2C is provided so as to enable the heating medium M from which waste heat has been recovered in the first cooler 54A to flow toward the evaporator 9C.

The returning line 3C communicates with the recovery line 2C and is provided so as to enable the heating medium M which has delivered waste heat to the evaporator 9C to flow toward the first cooler 54A.

In the present embodiment, the pump 8C is provided in the returning line 3C.

In the present embodiment, as the bypass lines 4C, two lines of a first bypass line 11C and a second bypass line 12C are provided.

The first bypass line 11C connects the recovery line 2C and the returning line 3C so that the downstream side of the pump 8C which serves as the inlet side of the first cooler 54A in terms of the flow of the heating medium M and the outlet side of the first cooler 54A communicate with each other. Therefore, the heating medium M is introduced into the recovery line 2C through the first bypass line 11C without flowing through the first cooler 54A from the recovery line 2C.

The second bypass line 12C connects the recovery line 2C and the returning line 3C so that the inlet side of the evaporator 9C and the upstream side of the pump 8C which serves as the outlet side of the evaporator 9C in terms of the flow of the heating medium M communicate with each other. Therefore, the heating medium M is introduced into the returning line 3C through the second bypass line 12C without flowing through the evaporator 9C from the recovery line 2C.

The flow rate-adjusting valves 7C are respectively provided at intermediate locations of the first bypass line 11C and the second bypass line 12C. It becomes possible to adjust the flow rates of the heating medium M that flows through the first bypass line 11C and the second bypass line 12C by adjusting the flow rate-adjusting valves 7C.

The control device 13C adjusts the flow rate-adjusting valves 7C and thus adjusts the flow rates of the heating medium M that flows through the first bypass line 11C and the second bypass line 12C so that the temperature of cooling air CA generated in the first cooler 54A becomes constant.

The low-boiling-point medium Rankine cycle 10C has the evaporator 9C that heats and evaporates a liquid-form low-boiling-point medium LM, a turbine 14C that is driven using the evaporated low-boiling-point medium LM, and a generator 15C that generates power by the driving of the turbine 14C.

Furthermore, this low-boiling-point medium Rankine cycle 10C has a low-boiling-point medium recovery line 16C that connects the outlet of the turbine 14C and the evaporator 9C, a pump 17C provided in the low-boiling-point medium recovery line 16C, and a condenser 18C which is provided between the outlet of the turbine 14C and the pump 17C in the low-boiling-point medium recovery line 16C and cools and condenses the low-boiling-point medium LM used to drive the turbine 14C. That is, the low-boiling-point medium Rankine cycle 10C of the present embodiment serves as a so-called simple low-boiling-point medium Rankine cycle.

According to the gas turbine plant 1C of the present embodiment, it is possible to obtain rotative power from waste heat from the first cooler 54A using the low-boiling-point medium Rankine cycle 10C. In addition, the waste heat recovery device 5C recovers waste heat in the low-boiling-point medium Rankine cycle 10C using different systems of heating media M from the low-boiling-point medium LM. Therefore, it is possible to select a variety of heating media M having higher heat exchange efficiencies in accordance with the temperature and the like of waste heat. In addition, it becomes possible to reduce the sizes of devices that carry out heat exchange in the first cooler 54A, the evaporator 9C, and the like using the liquid-form heating medium M.

In addition, heat is exchanged using the heating medium M, whereby it becomes easy to control heat exchange, and more effective use of waste heat becomes possible.

In addition, as the waste heat recovery device 5C, the bypass lines 4C, the flow rate-adjusting valves 7C, and the control device 13C are provided. Therefore, the flow rates of the heating medium M that flows through the bypass lines 4C are adjusted using the flow rate-adjusting valves 7C, whereby it is possible to adjust the flow rates of the heating medium M that flows into the first cooler 54A and the evaporator 9C, and it becomes possible to change the recovery amount of waste heat. As a result, it becomes possible to adjust the temperature of the cooling air CA that is generated in the first cooler 54A.

In addition, according to the control device 13C, it is possible to set the temperature of the cooling air CA to be constant by adjusting the recovery amount of waste heat. Therefore, it becomes possible to maintain the temperature of cooling air CA in an optimal state and improve the cooling effect on high-temperature components or it is possible to prevent the temperatures of high-temperature components from being excessively decreased and limit a decrease in the operation efficiency of the system.

Any one of the first bypass line 11C and the second bypass line 12C may be provided as the bypass line 4C.

In addition, the present invention is not limited to a case in which the low-boiling-point medium Rankine cycle 10C is provided in the first cooler 54A as in the present embodiment, and the low-boiling-point medium Rankine cycle 10C may be provided in the second cooler 54B and the third cooler 54C. The low-boiling-point medium Rankine cycles 10C may be provided in a plurality of coolers of the first cooler 54A, the second cooler 54B, and the third cooler 54C.

Thirteenth Embodiment

Figure 17:
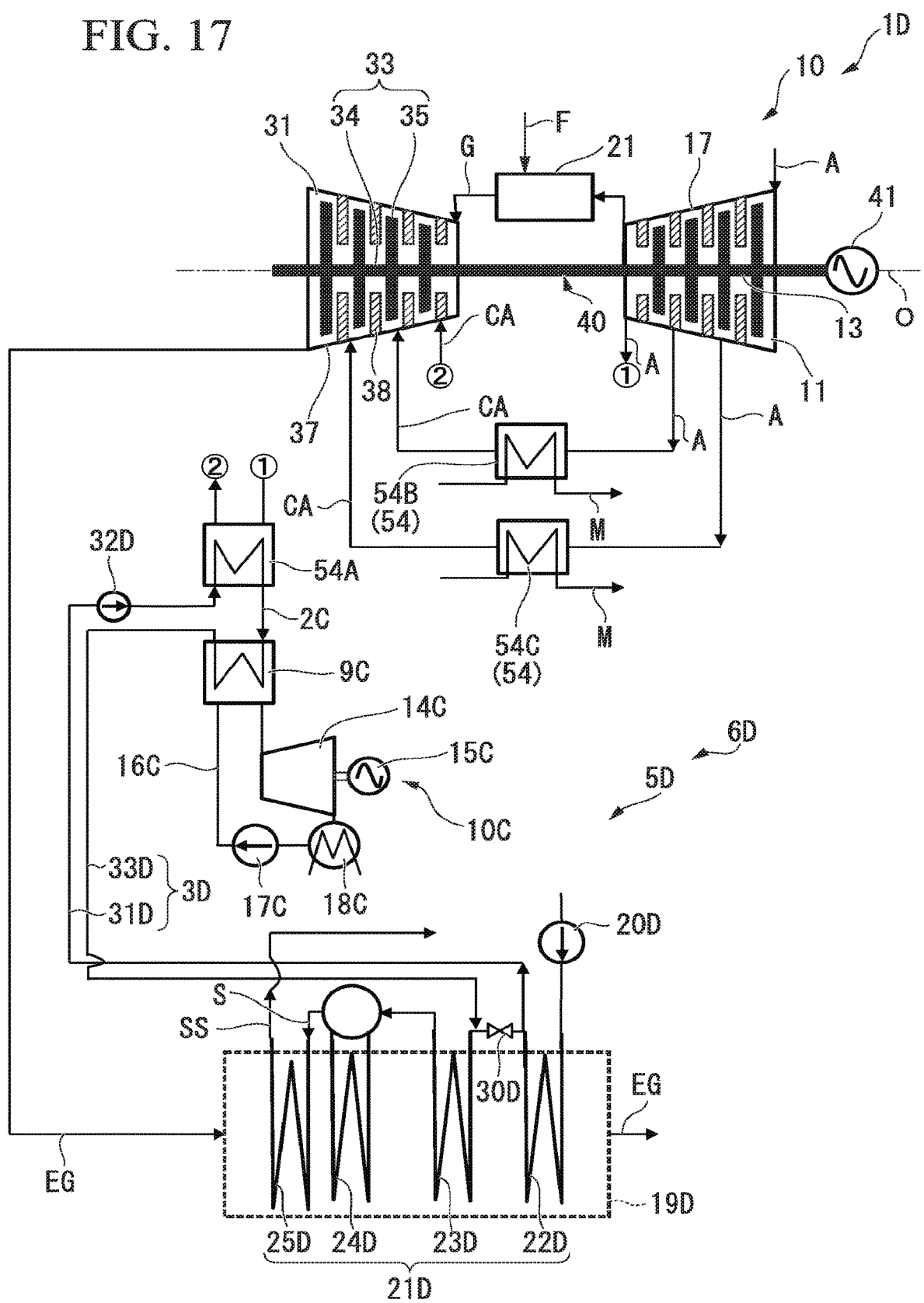
FIG. 17 is a system diagram of a gas turbine plant in a thirteenth embodiment of the present invention.

Next, a thirteenth embodiment of a gas turbine plant 1D according to the present invention will be described with reference to FIG. 17.

The gas turbine plant 1D of the present embodiment has the gas turbine plant 1 in the first embodiment as a basic constitution and is different from the first embodiment in terms of a waste heat recovery device 5D in a waste heat recovery system 6D.

The waste heat recovery device 5D has the cooling air coolers 54, the evaporator 9C, the recovery line 2C, a returning line 3D, a waste heat recovery boiler 19D that heats the water W using exhaust gas EG from the turbine 14C and introduces the water W into the first cooler 54A among the cooling air coolers 54 through the returning line 3D, and a water supply pump 20D that supplies water to the waste heat recovery boiler 19D.

The waste heat recovery boiler 19D generates steam S using the heat of the combustion gas G used to drive the turbine 14C, that is, exhaust gas EG exhausted from the gas turbine 10.

This waste heat recovery boiler 19D has substantially the same constitution as that of the waste heat recovery boiler 153 of the second embodiment.

That is, the waste heat recovery boiler has a steam generating unit 21D that generates the steam S from the water W supplied using the water supply pump 20D.

This steam generating unit 21D has a first economizer 22D that heats the water W from the water supply pump 20D, a second economizer 23D that further heats the water W that has been heated using the first economizer 22D, a flow rate-adjusting valve 30D provided between the first economizer 22D and the second economizer 23D, an evaporator 24D that turns the water W that has been heated using the second economizer 23D into steam S, and a superheater 25D that superheats the steam S generated using the evaporator 24D, generates superheated steam SS, and discharge the superheated steam SS to the outside.

The constituent elements of the steam generating unit 21D are arrange in an order of the superheater 25D, the evaporator 24D, the second economizer 23D, and the first economizer 22D from the turbine 31 side to the downstream side of the exhaust gas EG.

The returning line 3D has an introduction line 31D and an introduction pump 32D which connect the outlet of the first economizer 22D (between the flow rate-adjusting valve 30D and the first economizer 22D) and the first cooler 54A so as to enable the water W from the waste heat recovery boiler 19D to be introduced into the first cooler 54A from the outlet of the first economizer 22D and a releasing line 33D which connects the evaporator 9C and the inlet of the second economizer 23D (between the flow rate-adjusting valve 30D and the inlet of the second economizer 23D) and releases the water W to the waste heat recovery boiler 19D from the evaporator 9C.

According to the gas turbine plant 1D of the present embodiment, the waste heat recovery boiler 19D is provided as the waste heat recovery device 5D, whereby it is possible to recover waste heat from the cooling air coolers 54 using the water W from the waste heat recovery boiler 19D as a heating medium. Therefore, it becomes possible to reduce costs by sharing facilities, and it is possible to make the waste heat recovery system 6D function as a part of a cogeneration system.

In addition, since it becomes possible to adjust the flow rates of the water W that flows through the first cooler 54A and the evaporator 9C by adjusting the flow rates using the flow rate-adjusting valve 30D, it becomes possible to adjust the recovery amount of waste heat and obtain cooling air CA having a desired temperature.

Figure 9:
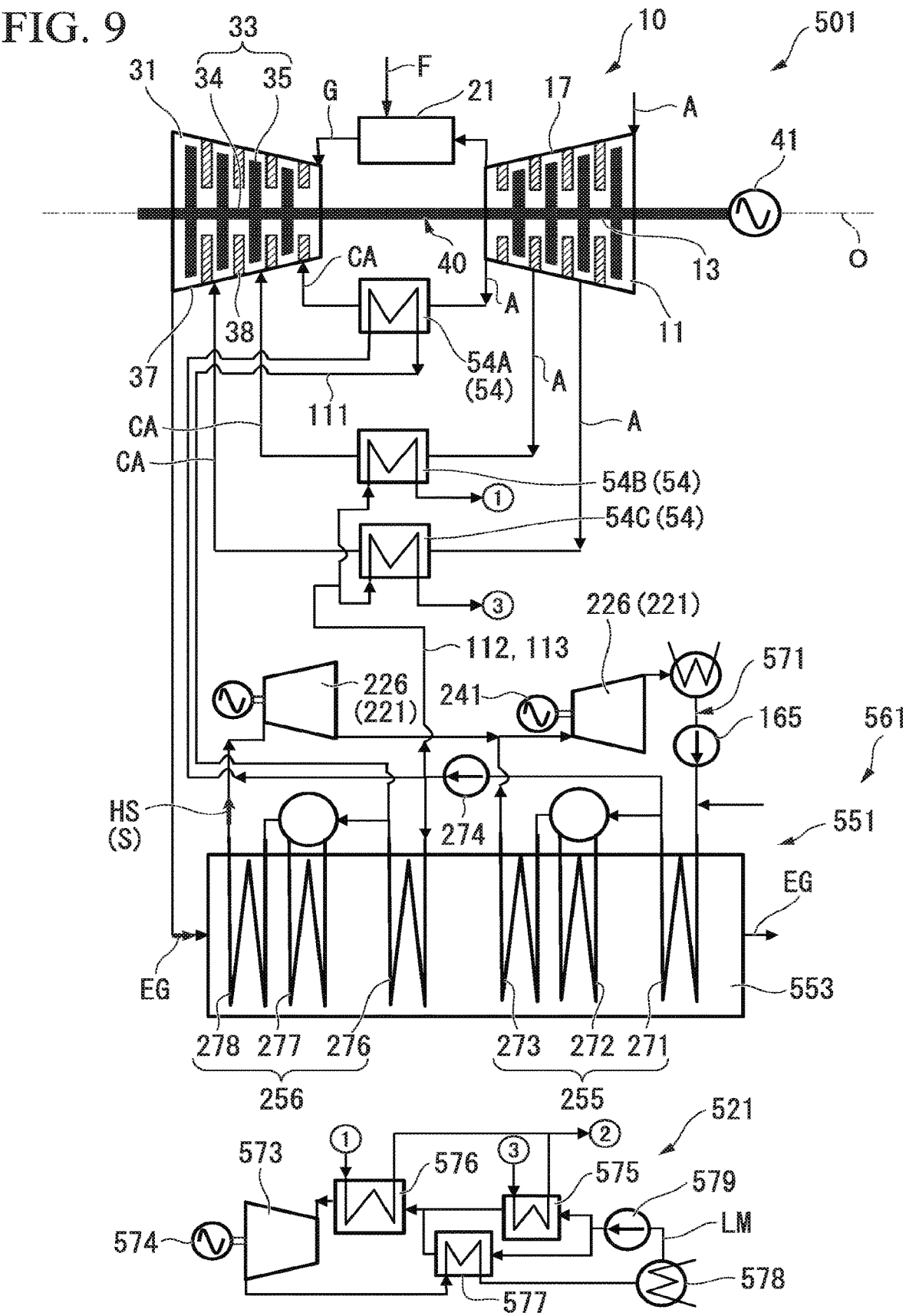
FIG. 9 is a system diagram of a gas turbine plant in a sixth embodiment of the present invention.

Here, in the present embodiment, the waste heat recovery device 5D may also further include a steam turbine that is driven using steam S that is generated using the waste heat recovery boiler 19D (for example, refer to FIG. 9). In addition, in this case, it is possible to recover waste heat from the first cooler 54A using the water W discharged from the steam turbine as a heating medium. That is, it is possible to make the waste heat recovery system 6D function as a part of a cogeneration system, and it becomes possible to reduce costs by sharing facilities.

Other Modification Examples of Gas Turbine Plant

The above-described gas turbine plants of the respective embodiments and modification examples have been described; however, as described below, it is possible to employ a variety of other modification examples.

For example, the constitutions of the respective embodiments described above can be appropriately combined together. Specifically, in the third and fourth embodiments, the steam turbine may not be necessarily provided.

Furthermore, as the above-described low-boiling-point medium Rankine cycles that have been described in the embodiments, low-boiling-point medium Rankine cycles having other forms can also be applied.

Figure 18:
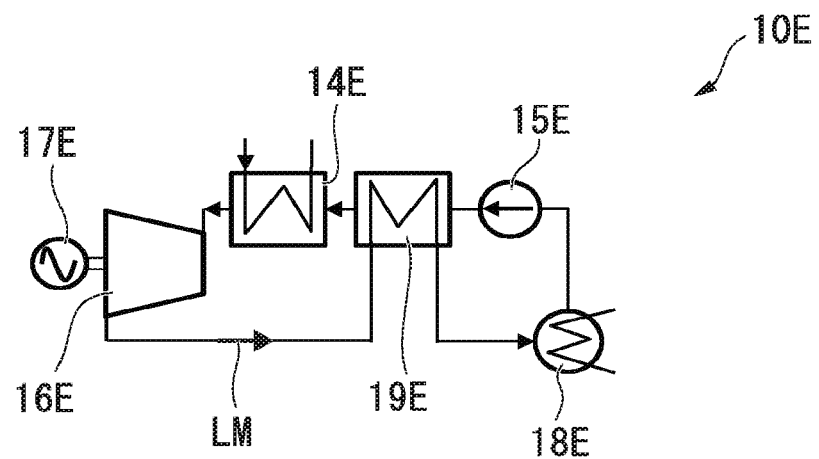
FIG. 18 is a system diagram showing a first example of a low-boiling-point medium Rankine cycle that is used in the gas turbine plant according to the present invention.

Examples of other low-boiling-point medium Rankine cycles include regenerative low-boiling-point medium Rankine cycles as shown in FIG. 18. Specifically, this low-boiling-point medium Rankine cycle 10E has a heater 14E that heats and evaporates a liquid-form low-boiling-point medium LM, a pump 15E that introduces the low-boiling-point medium LM into the heater 14E, a turbine 16E that is driven using the evaporated low-boiling-point medium LM, a generator 17E that generates power by the driving of the turbine 16E, a condenser 18E that condenses the low-boiling-point medium LM used to drive the turbine 16E, and a reheater 19E that preheats the low-boiling-point medium LM that is to be introduced from the condenser 18E into the heater 14E using the heat of the low-boiling-point medium LM used to drive the turbine 16E and sends the low-boiling-point medium to the heater 14E.

Figure 19:
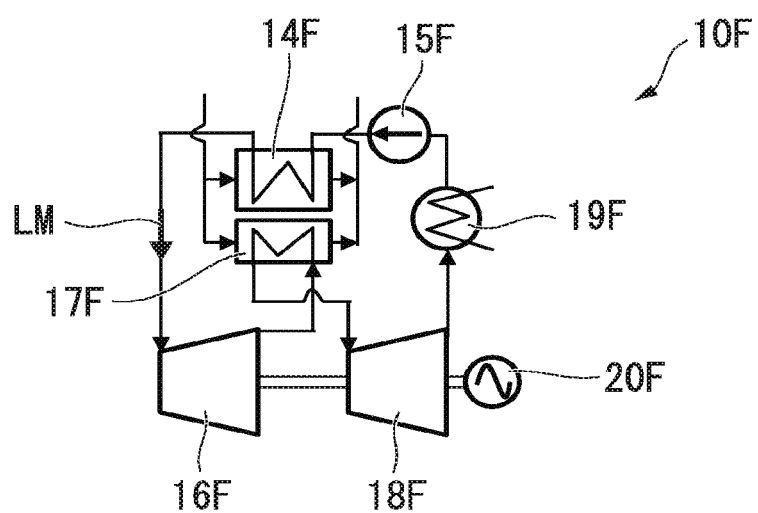
FIG. 19 is a system diagram showing a second example of the low-boiling-point medium Rankine cycle that is used in the gas turbine plant according to the present invention.

The low-boiling-point medium Rankine cycle 10F shown in FIG. 19 is a so-called reheated low-boiling-point medium Rankine cycle. This low-boiling-point medium Rankine cycle 10F has an evaporator 14F that heats and evaporates a liquid-form low-boiling-point medium LM, a pump 15F that introduces the low-boiling-point medium LM into the evaporator 14F, a high-pressure turbine 16F that is driven using the evaporated low-boiling-point medium LM, a reheater 17F that recovers the low-boiling-point medium LM from the outlet of the high-pressure turbine 16F and heats the low-boiling-point medium, a low-pressure turbine 18F that is driven using the low-boiling-point medium LM from the reheater 17F, a condenser 19F that condenses the low-boiling-point medium LM used to drive the low-pressure turbine 18F, and a generator 20F that generates power by the driving of the high-pressure turbine 16F and the low-pressure turbine 18F.

Figure 20:
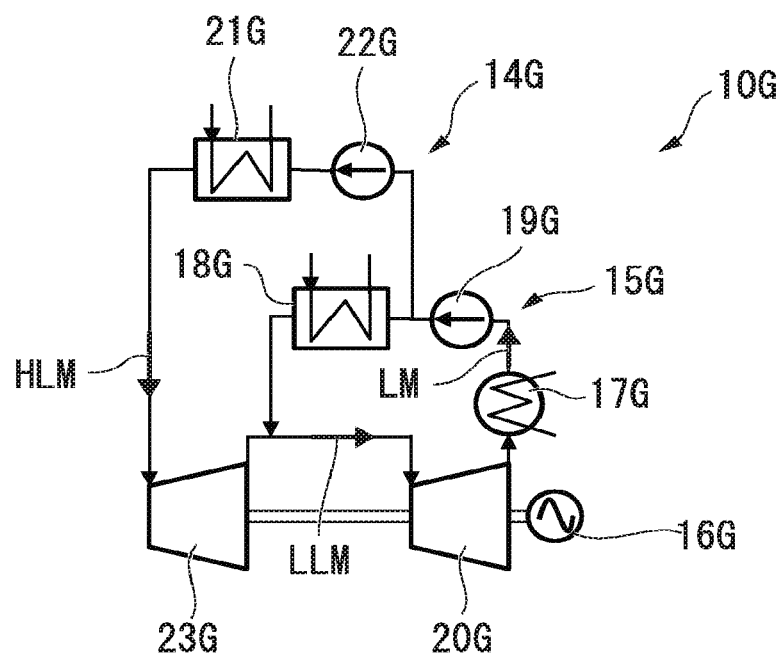
FIG. 20 is a system diagram showing a third example of the low-boiling-point medium Rankine cycle that is used in the gas turbine plant according to the present invention.

A low-boiling-point medium Rankine cycle 10G shown in FIG. 20 is a so-called multi-pressure low-boiling-point medium Rankine cycle. This low-boiling-point medium Rankine cycle 10G has a high-pressure portion 14G a low-pressure portion 15G and a generator 16G that generates power by the driving of the high-pressure portion 14G and the low-pressure portion 15G.

The low-pressure portion 15G has a low-pressure evaporator 18G that heats and evaporates a liquid-form low-boiling-point medium LM and generates a gas-form low-pressure low-boiling-point medium LLM, a low-pressure pump 19G that supplies the liquid-form low-pressure low-boiling-point medium LM to the low-pressure evaporator 18G; a low-pressure turbine 20G that is driven using the low-pressure low-boiling-point medium LLM, and a condenser 17G that condenses the low-pressure low-boiling-point medium LLM emitted from the low-pressure turbine 20G.

The high-pressure portion 14G has a high-pressure evaporator 21G that heats and evaporates the liquid-form high-boiling-point medium LM from the condenser 17G and generates a gas-form high-pressure high-boiling-point medium HLM, a high-pressure pump 22G that supplies the liquid-form low-boiling-point medium LM from the condenser 17G to the high-pressure evaporator 21Q and a high-pressure turbine 23G that is driven using the high-pressure low-boiling-point medium HLM.

The low-boiling-point medium LM from the condenser 17G is supplied to the high-pressure evaporator 21G using the high-pressure pump 22G from between the low-pressure pump 19G and the low-pressure evaporator 18G The generator 16G generates power by the driving of the high-pressure turbine 23G and the low-pressure turbine 20G.

Figure 21:
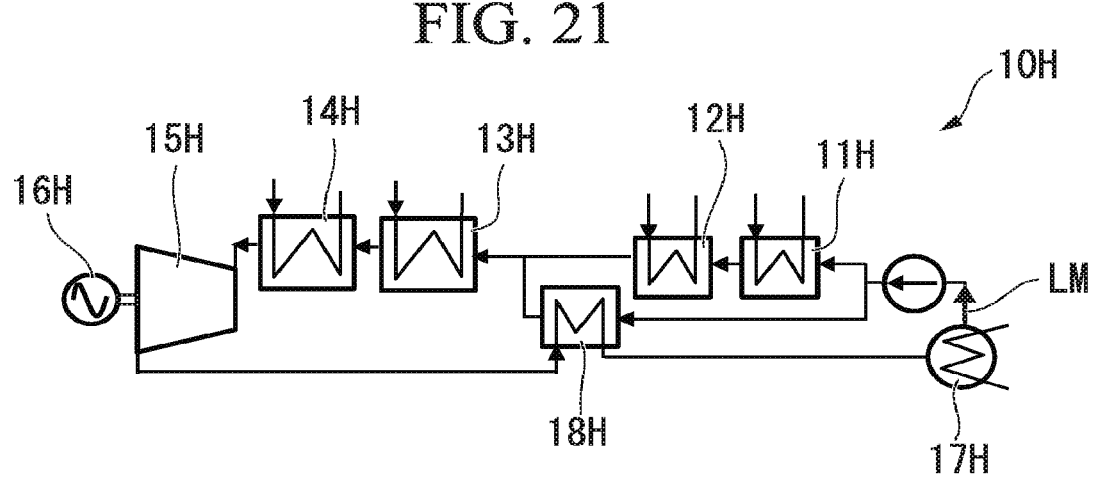
FIG. 21 is a system diagram showing a fourth example of the low-boiling-point medium Rankine cycle that is used in the gas turbine plant according to the present invention.

A low-boiling-point medium Rankine cycle 10H shown in FIG. 21 is a so-called preheat low-boiling-point medium Rankine cycle having four heat source temperatures.

The low-boiling-point medium Rankine cycle 10H has a first heater 11H that heats a liquid-form low-boiling-point medium LM, a second heater 12H that further heats the low-boiling-point medium LM from the first heater 11H, a third heater 13H that further heats the low-boiling-point medium LM from the second heater 12H, a fourth heater 14H that further heats and evaporate the low-boiling-point medium LM from the third heater 13H, a turbine 15H that is driven using the evaporated low-boiling-point medium LM, a generator 16H that generates power by the driving of the turbine 15H, a condenser 17H that condenses the low-boiling-point medium LM used to drive the turbine 15H, and a reheater 18H that heats the low-boiling-point medium LM which has been introduced from the condenser 17H using the heat of the low-boiling-point medium LM used to drive the turbine 15H and sends the low-boiling-point medium to the third heater 13H.

Figure 22:
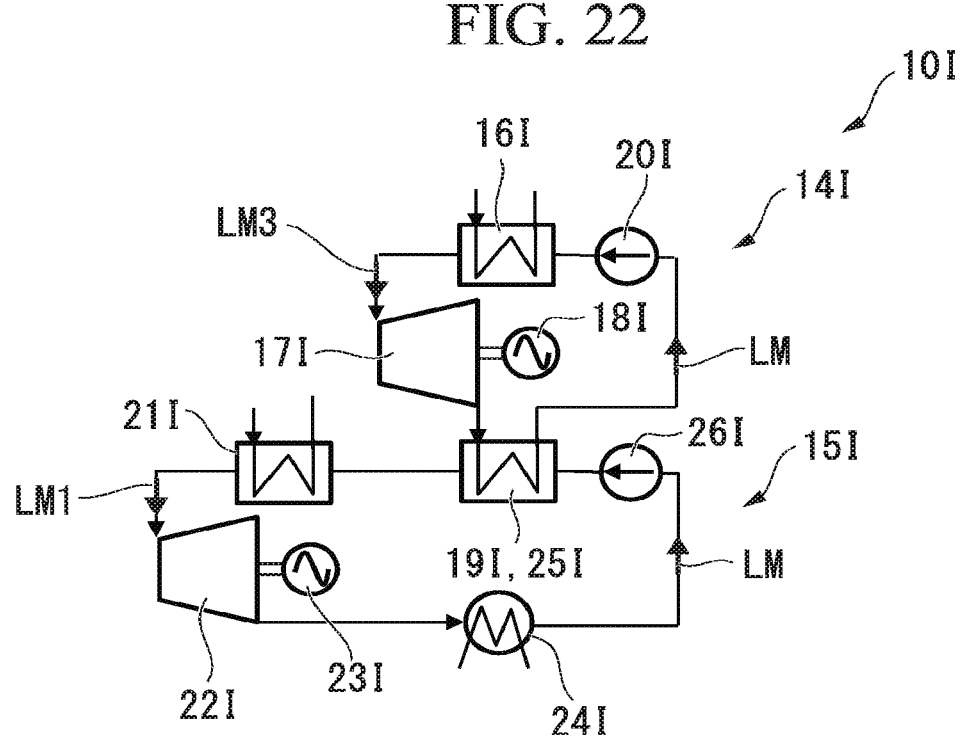
FIG. 22 is a system diagram showing a fifth example of the low-boiling-point medium Rankine cycle that is used in the gas turbine plant according to the present invention.

A low-boiling-point medium Rankine cycle 10I shown in FIG. 22 is a so-called cascade low-boiling-point medium Rankine cycle having two heat source temperatures. This low-boiling-point medium Rankine cycle 10I has a high-temperature portion 14I and a low-temperature portion 15I.

The high-temperature portion 14I has a high-temperature evaporator 161 that heats and evaporates a low-boiling-point medium LM and generates a gas-form high-temperature low-boiling-point medium LM3, a high-temperature turbine 171 that is driven using the high-temperature low-boiling-point medium LM3, a generator 181 that generates power by the driving of the high-temperature turbine 171, a high-temperature condenser 191 that condenses the high-temperature low-boiling-point medium LM3 emitted from the high-temperature turbine 171, and a high-temperature pump 201 that circulates the low-boiling-point medium LM (and the high-temperature low-boiling-point medium LM3).

The low-temperature portion 15I has a low-temperature evaporator 211 that heats and evaporates the low-boiling-point medium LM and generates a gas-form low-temperature low-boiling-point medium LM1, a low-temperature turbine 221 that is driven using the low-temperature low-boiling-point medium LM1, a generator 231 that generates power by the driving of the low-temperature turbine 221, a low-temperature condenser 241 that condenses the low-temperature low-boiling-point medium LM1 emitted from the low-temperature turbine 221, a low-temperature heater 251 which is provided between the low-temperature evaporator 211 and the low-temperature condenser 241 and preheats the low-temperature low-boiling-point medium LM1, and a low-temperature pump 261 that circulates the low-boiling-point medium LM (and the low-temperature low-boiling-point medium LM1).

In an example of FIG. 22, the low-temperature heater 251 and the high-temperature condenser 191 form a unit body and perform mutual functions.

The present invention is not limited to the above-described low-boiling-point medium Rankine cycle, and, additionally, it is possible to apply low-boiling-point medium Rankine cycles having a variety of forms to the present invention.

In addition, for example, the waste recovery heat systems 61 (161, 261, 361, 461, 561, 961, 6A, 6C, and 6D) in the respective embodiments described above may be additionally provided in gas turbine plants which are not provided with any waste heat recovery systems. In addition, the above-described low-boiling-point medium Rankine cycles 421 (521, 910, 10A, 10B, 10C, 10E, 10F, 10G 10H, and 10I) may be additionally provided in gas turbine plants which are provided with cooling air coolers. In this case, the cooling air coolers 54 may be changed as necessary. In addition, in a case in which waste heat is recovered in low-boiling-point medium Rankine cycles using heating media M, it is also possible to additionally provide systems of heating media M. In addition, in gas turbines in which waste heat recovery boilers are installed and gas turbines additionally provided with the waste heat recovery boiler 153 (173, 253, 353, 553, or 19D), it is also possible to additionally provide systems that recover waste heat using water W from the waste heat recovery boiler.

REFERENCE SIGNS LIST 1 gas turbine plant
10 gas turbine
11 compressor
13 compressor rotor
17 compressor casing
21 combustor
31 turbine
33 turbine rotor
34 rotor shaft
35 turbine blade
37 turbine casing
38 turbine vane
40 gas turbine rotor
41 generator
54 cooling air cooler
51 waste heat recovery device
61 waste heat recovery system
54A first cooler
54B second cooler
54C third cooler
O shaft line
CA cooling air
M heating medium
A air
F fuel
G combustion gas
101 gas turbine plant
111 first recovery line
112 second recovery line
113 third recovery line
151 waste heat recovery device
153 waste heat recovery boiler
155 steam generating unit
156 first economizer
157 second economizer
158 evaporator
159 superheater
161 waste heat recovery system
165 water supply pump
EG exhaust gas
W water
S steam
SS superheated steam
181 waste heat recovery device
173 waste heat recovery boiler
170 branching line
201 gas turbine plant
211 water supply pump
212 high-pressure water supply line
213 low-pressure steam line
214 high-pressure steam line
215 high-pressure steam recovery line
221 steam turbine
225 low-pressure steam turbine
226 high-pressure steam turbine
241 generator
245 steam condenser
251 waste heat recovery device
253 waste heat recovery boiler
255 low-pressure steam generating unit
256 high-pressure steam generating unit
261 waste heat recovery system
271 low-pressure economizer
272 low-pressure evaporator
273 low-pressure superheater
274 high-pressure water supply pump
275 first high-pressure economizer
276 second high-pressure economizer
277 high-pressure evaporator
278 (first) high-pressure superheater
279 second high-pressure superheater
LS low-pressure steam
HS high-pressure steam
301 gas turbine plant
312 reheated steam line
313 intermediate-pressure steam recovery line
314 intermediate-pressure water supply line
315 intermediate-pressure steam line
321 intermediate-pressure steam turbine
351 waste heat recovery device
353 waste heat recovery boiler
355 intermediate-pressure steam generating unit
361 waste heat recovery system
371 intermediate-pressure economizer
372 intermediate-pressure evaporator
373 intermediate-pressure superheater
374 intermediate-pressure water supply pump
381 reheating unit
382 first reheater
383 second reheater
391 auxiliary compressor
401 gas turbine plant
461 waste heat recovery system
421 low-boiling-point medium Rankine cycle
422 turbine
425 high-temperature low-boiling-point medium Rankine cycle
426 high-temperature turbine
427 high-temperature evaporator
428 high-temperature steam recovery line
429 high-temperature pump
435 intermediate-temperature low-boiling-point medium Rankine cycle
436 intermediate-temperature turbine
437 intermediate-temperature evaporator
438 intermediate-temperature steam recovery line
439 intermediate-temperature pump
440 intermediate-temperature heater 445 low-temperature low-boiling-point medium Rankine cycle
446 low-temperature turbine
447 low-temperature evaporator
448 low-temperature steam recovery line
449 low-temperature condenser
450 low-temperature pump
451 waste heat recovery device
452 low-temperature heater
471 generator
LM low-boiling-point medium
HLM high-temperature low-boiling-point medium
MLM intermediate-temperature low-boiling-point medium
LLM low-temperature low-boiling-point medium
RS reheated steam
501 gas turbine plant
521 low-boiling-point medium Rankine cycle
551 waste heat recovery device
553 waste heat recovery boiler
561 waste heat recovery system
571 Rankine cycle
573 turbine
574 generator
575 heater
576 evaporator
577 reheater
578 condenser
579 pump
601 gas turbine plant
701 gas turbine plant
801 gas turbine plant
901 gas turbine plant
910 low-boiling-point medium Rankine cycle
911 low-pressure portion
912 low-pressure turbine
913 low-pressure pump
914 low-pressure evaporator
921 intermediate-pressure portion
922 intermediate-pressure turbine
923 intermediate-pressure pump
924 intermediate-pressure evaporator
931 high-pressure portion
932 high-pressure turbine
533 high-pressure pump
934 high-pressure evaporator
951 waste heat recovery device
961 waste heat recovery system
981 low-pressure supply line
982 intermediate-pressure supply line
983 high-pressure supply line
991 low-pressure recovery line
992 intermediate-pressure recovery line
995 condenser
999 generator
1A gas turbine plant
3A first recovery line
4A second recovery line
5A waste heat recovery device
6A waste heat recovery system
8A first pump
9A second pump
10A low-boiling-point medium Rankine cycle
11A first heater
12A second heater
13A turbine
14A generator
15A condenser
16A reheater
17A pump
4B third recovery line
9B third pump
10B low-boiling-point medium Rankine cycle
12B third heater
1C gas turbine plant
2C recovery line
3C returning line
4C bypass line
5C waste heat recovery device
6C waste heat recovery system
7C flow rate-adjusting valve
8C pump
9C evaporator
10C low-boiling-point medium Rankine cycle
11C first bypass line
12C second bypass line
13C control device
14C turbine
15C generator
16C low-boiling-point medium recovery line
17C pump
18C condenser
1D gas turbine plant
3D returning line
5D waste heat recovery device
6D waste heat recovery system
19D waste heat recovery boiler
20D water supply pump
21D steam generating unit
22D first economizer
23D second economizer
24D evaporator
25D superheater
30D flow rate-adjusting valve
31D introduction line
32D introduction pump
33D releasing line
10E low-boiling-point medium Rankine cycle
14E heater
15E pump
16E turbine
17E generator
18E condenser
19E reheater
10F low-boiling-point medium Rankine cycle
14F evaporator
15F pump
16F high-pressure turbine
17F reheater
18F low-pressure turbine
19F condenser
20F generator
10G low-boiling-point medium Rankine cycle
14G high-pressure portion
15G low-pressure portion
16G generator
17G condenser
18G low-pressure evaporator
19G low-pressure pump
20G low-pressure turbine
21G high-pressure evaporator
22G high-pressure pump
23G high-pressure turbine
10H low-boiling-point medium Rankine cycle 11H first heater
12H second heater
13H third heater
14H fourth heater
15H turbine
16H generator
17H condenser
18H reheater
101 low-boiling-point medium Rankine cycle
141 high-temperature portion
151 low-temperature portion
161 high-temperature evaporator
171 high-temperature turbine
181 generator
191 high-temperature condenser
201 high-temperature pump
211 low-temperature evaporator
221 low-temperature turbine
231 generator
241 low-temperature condenser
251 low-temperature heater
261 low-temperature pump
LM1 low-temperature low-boiling-point medium
LM3 high-temperature low-boiling-point medium

What is claimed is:

1. A waste heat recovery system comprising:
a cooling air cooler configured to: (i) bleed air from a compressor configured to compress the air and included in a gas turbine which further includes a combustor configured to combust fuel in the air which has been compressed so as to generate combustion gas, and a turbine configured to be driven using the combustion gas; and (ii) cool the air bled from the compressor so as to generate cooling air; and
a waste heat recovery device configured to recover waste heat from the cooling air cooler,
wherein:
the waste heat recovery device includes a recovery line, an auxiliary compressor, and a waste heat recovery boiler configured to generate steam using heat of the combustion gas from the gas turbine;
the waste heat recovery device is configured to introduce the air bled from the compressor and water to the cooling air cooler;
the cooling air cooler is configured to cool the air bled from the compressor by heat exchange with the water, which is maintained in a liquid phase in the cooling air cooler, whereby the water recovers waste heat included in the air bled from the compressor;
the waste heat recovery device is configured to introduce the water, which has recovered the waste heat from the air bled from the compressor, to the recovery line;
the auxiliary compressor is configured to compress the cooling air generated in the cooling air cooler;
the waste heat recovery device is configured to cool the combustor with the cooling air compressed by the auxiliary compressor;
the waste heat recovery device is configured to introduce the water, which has recovered the waste heat from the air bled from the compressor in the cooling air cooler, into the recovery line while maintaining the water in the liquid phase;
the waste heat recovery boiler includes an evaporator in a flow path of the combustion gas;
the recovery line is configured to send the water maintained in the liquid phase, which has recovered the waste heat from the air bled from the compressor, from the cooling air cooler to the evaporator; and
the evaporator is configured to evaporate the water maintained in the liquid phase sent from the cooling air cooler through the recovery line.

2. A gas turbine plant comprising:
the waste heat recovery system according to claim 1; and
the gas turbine.

3. An installation method for waste heat recovery systems, the installation method comprising:
installing the waste heat recovery system according to claim 1 in the gas turbine.

4. A waste heat recovery method comprising:
bleeding air from a compressor in a gas turbine including the compressor that compresses the air, a combustor that generates combustion gas by combusting fuel in the air which has been compressed by the compressor, and a turbine that is driven using the combustion gas;
cooling the air bled from the compressor by a cooling air cooler, thereby generating cooling air that cools high-temperature components; and
recovering waste heat discharged from the cooling air cooler using a waste heat recovery device,
wherein:
the air bled from the compressor and water are introduced to the cooling air cooler, the air bled from the compressor is cooled by heat exchange with the water which is maintained in a liquid phase in the cooling air cooler and the water recovers the waste heat included in the air bled from the compressor;
the water, which has recovered the waste heat from the air bled from the compressor is introduced to a recovery line, the cooling air generated in the cooling air cooler is compressed by an auxiliary compressor, and the combustor is cooled with the cooling air compressed by the auxiliary compressor;
the water, which has recovered the waste heat from the air bled from the compressor in the cooling air cooler, is introduced into the recovery line while maintaining the water in the liquid phase;
the waste heat recovery device has a waste heat recovery boiler which generates steam using heat of the combustion gas from the gas turbine;
the waste heat recovery boiler includes an evaporator in a flow path of the combustion gas;
the recovery line sends the water maintained in the liquid phase, which has recovered the waste heat from the air bled from the compressor, from the cooling air cooler to the evaporator; and
the evaporator evaporates the water maintained in the liquid phase sent from the cooling air cooler through the recovery line.

* * * * *